US006787232B1

(12) United States Patent
Chiang et al.

(10) Patent No.: US 6,787,232 B1
(45) Date of Patent: Sep. 7, 2004

(54) INTERCALATION COMPOUNDS AND ELECTRODES FOR BATTERIES

(75) Inventors: Yet-Ming Chiang, Framingham, MA (US); Donald R. Sadoway, Waltham, MA (US); Young-Il Jang, Knoxville, TN (US); Biyan Huang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/686,331

(22) Filed: Oct. 11, 2000

Related U.S. Application Data

(63) Continuation of application No. PCT/US99/09384, filed on Apr. 30, 1999.
(60) Provisional application No. 60/083,719, filed on Apr. 30, 1998, and provisional application No. 60/083,834, filed on May 1, 1998.

(51) Int. Cl.[7] .............................................. B32B 51/06

(52) U.S. Cl. ........................ 428/403; 423/599; 423/600; 423/625; 423/605; 423/641; 429/218.1; 429/232; 429/245

(58) Field of Search ................................ 423/599, 600, 423/625, 593, 605, 641; 429/218.1, 232, 245; 428/403

(56) References Cited

U.S. PATENT DOCUMENTS

| | | | |
|---|---|---|---|
| 3,939,008 A | | 2/1976 | Longo et al. |
| 5,225,297 A | * | 7/1993 | Garcia-Alvarado et al. . 429/220 |
| 5,429,890 A | | 7/1995 | Pynenburg et al. |
| 5,500,142 A | | 3/1996 | Ushida et al. |
| 5,637,542 A | | 6/1997 | Takenaka |
| 5,747,193 A | * | 5/1998 | Gerand et al. ............... 429/224 |
| 5,783,333 A | * | 7/1998 | Mayer ......................... 429/223 |
| 5,910,382 A | | 6/1999 | Goodenough et al. |
| 5,955,219 A | * | 9/1999 | Tabata ......................... 429/220 |
| 6,159,636 A | * | 12/2000 | Wang et al. ................. 429/223 |
| 6,168,887 B1 | | 1/2001 | Dahn et al. .................. 429/224 |
| 6,231,779 B1 | | 5/2001 | Chiang et al. |
| 6,267,943 B1 | * | 7/2001 | Manev et al. ................ 423/599 |
| 6,277,521 B1 | * | 8/2001 | Gao et al. .................. 429/231.1 |
| 6,306,542 B1 | * | 10/2001 | Nakano et al. .............. 429/224 |
| 6,322,744 B1 | * | 11/2001 | Kelley et al. ................ 264/446 |
| 6,379,842 B1 | * | 4/2002 | Mayer ....................... 429/231.3 |
| 6,428,766 B1 | * | 8/2002 | Fujino et al. ................ 423/599 |
| 2002/0048706 A1 | * | 4/2002 | Mayes et al. |

FOREIGN PATENT DOCUMENTS

| | | |
|---|---|---|
| JP | 2-168559 | 6/1990 |
| WO | WO 96/16450 A1 | 5/1996 |
| WO | WO 97/19477 A1 | 5/1997 |
| WO | WO 97/23918 A1 | 7/1997 |
| WO | WO 98/16960 A2 | 4/1998 |

OTHER PUBLICATIONS

WO 98/16960 A2, filed Oct. 10, 1997.
WO 98/16960 A3, filed Oct. 10, 1997.
Abstract of Japan, vol. 14, No. 433, Sep. 17, 1990, JP 02168559.
Amatucci, G. G., "Surface treatments of $Li_{1+x}Mn_{2-x}O_4$ spinels for improved elevated temperature performance," *Solid State Ionics* 104 (1997) 13–25.
Chiang, Yet–Ming et al., "High Capacity, Temperature–Stable Lithium Aluminum Manganese Oxide Cathodes for Rechargeable Batteries," *Electrochemical and Solid–State Letters*, 2 (3) 107–110 (1999).
Cras, F. Le et al., "Lithium intercalation in Li–Mg–Mn–O and Li–Al–Mn–O spinels," *Solid State Ionics* 89 (1996) 203–213.
Lobitz, P., et al., "Ionic conductivity in poly(ethylene oxide)– poly(alkylmethacrylate)–block copolymer mixtures with LiI," *Solid State Ionics*, 58 (1992), pp. 41–48.

(List continued on next page.)

*Primary Examiner*—H. Thi Le
(74) *Attorney, Agent, or Firm*—Wolf, Greenfield, & Sacks, P.C.

(57) ABSTRACT

This invention concerns intercalation compounds and in particular lithium intercalation compounds which have improved properties for use in batteries. Compositions of the invention include particulate metal oxide material having particles of multicomponent metal oxide, each including an oxide core of at least first and second metals in a first ratio, and each including a surface coating of metal oxide or hydroxide that does not include the first and second metals in the first ratio formed by segregation of at least one of the first and second metals from the core. The core may preferably comprise $Li_xM_yN_zO_2$ wherein M and N are metal atom or main group elements, x, y and z are numbers from about 0 to about 1 and y and z are such that a formal charge on $M_yN_z$ portion of the compound is (4–x), and having a charging voltage of at least about 2.5V. The invention may also be characterized as a multicomponent oxide microstructure usable as a lithium intercalation material including a multiphase oxide core and a surface layer of one material, which is a component of the multiphase oxide core, that protects the underlying intercalation material from chemical dissolution or reaction. In a particular preferred example the multicomponent oxide may be an aluminum-doped lithium manganese oxide composition. Such aluminum-doped lithium manganese oxide compositions, having an orthorhombic structure, also form a part of the invention. In addition, the invention includes articles, particularly electrodes, for batteries formed from the compositions of the invention, and batteries including such electrodes. The invention further relates to a composite intercalation material comprising at least two compounds in which at least one compound has an orthorhombic structure $Li_xAl_yMn_{1-y}O_2$, where y is nonzero, or a mixture of orthorhombic and monoclinic $Li_xAl_yMn_{1-y}O_2$.

11 Claims, 18 Drawing Sheets

OTHER PUBLICATIONS

Li, Jean, et al., "Mixed (electronic and ionic) conductive solid polymer matrix, 1," *Makromol. Chem.*, 192 (1991), pp. 3043–3050.

Cao, Y., et al., "Efficient, fast response light–emitting electrochemical cells: Electroluminescent and solid electrolyte polymers with interpenetrating network morphology," *Appl. Phys. Lett.*, 68(23) (Jun. 3, 1996), pp. 3218–3220.

Search Report of International Application No. PCT/US99/09384, mailed Sep. 16, 1999.

International Preliminary Examination Report of International Application No. PCT/US99/09384, mailed Jul. 4, 2000.

Written Opinion of International Application No. PCT/US99/09384, mailed Mar. 21, 2000.

* cited by examiner

Al
Mn
BF Image
200 nm

INTERCALATION COMPOUNDS AND ELECTRODES FOR BATTERIES

This application is a continuation of international application serial no. PCT/US99/09384 filed Apr. 30, 1999, which claims priority to U.S. provisional application ser. No. 60/083,719, filed Apr. 30, 1998 and Ser. No. 60/083,834, filed May 1, 1998.

This invention was made with government support under Grant Number DE-ACO7-94ID13223 awarded by the U.S. Department of Energy. The government has certain rights in the invention.

FIELD OF THE INVENTION

The present invention relates to intercalation compounds for use as electrodes for batteries, and in particular metal ion doped lithium manganese oxide compositions, articles manufactured with such compositions, and batteries including electrodes formed from such compositions.

BACKGROUND OF THE INVENTION

The present inventors, or at least some of them, have previously provided an extensive review of the background behind the use of lithium intercalation compounds in rechargeable batteries, international application no. PCT/US97/18839, filed Oct. 10, 1997 by Mayes, et al, entitled POLYMER ELECTROLYTE, INTERCALATION COMPOUNDS AND ELECTRODES FOR BATTERIES published as WO 98/16960 incorporated herein by reference. That patent specification includes examples of compositions of the formula $Li_xM_yN_zO_2$, wherein M and N are each a metal atom or main group element, and methods for synthesizing such compositions which are demonstrated to have improved electrochemical properties. WO 98/16960, at least insofar as it relates to intercalation compounds, is incorporated herein by reference.

The present inventors have continued to investigate lithium intercalation compounds to identify new compounds with further improved properties for use in batteries.

Thus, it is an object of the present invention to provide lithium intercalation compounds, and methods of their production, which have improved properties for use in batteries.

Other objects of the invention may become apparent from the following description which is given by way of example only and with reference to specific examples.

SUMMARY OF THE INVENTION

According to one aspect of the present invention, there is provided a composition including particulate metal oxide material including a plurality of particles of multicomponent metal oxide, each including an oxide core of at least first and second metals in a first ratio, and each including a surface coating of metal oxide or hydroxide that does not include the first and second metals in the first ratio formed by segregation of at least one of the first and second metals from the core.

According to a further aspect of the present invention there is provided a composition including particulate metal oxide material including particles of a multicomponent metal oxide, each including an oxide core of at least first and second metals in a first ratio, and each including a surface coating of metal oxide or hydroxide that does include the first and second metals in the first ratio formed by application of an auxiliary metal oxide or hydroxide to the particles, and the cores comprise $Li_xM_yN_zO_2$, wherein M is a metal atom or a main group element, N is a metal atom or a main group element, each of x, y and z is a number from about 0 to about 1, y and z are such that a formal charge on a $M_yN_z$ portion of the compound is (4−x), and having a charging voltage of at least about 2.5V.

According to a further aspect of the present invention there is provided an article including particles as referred to in the previous two paragraphs, wherein the particles are ion intercalation particles at least some of which are in contact with an electrically-conductive material and an ionically-conductive material.

According to a further aspect of the present invention there is provided a method including allowing a first component of a multicomponent oxide based intercalation compound to segregate from a plurality of particles of the compound disproportionately to the surfaces of the plurality of particles to form protective layers of the first component on the particles; exposing the plurality of the particles to chemically degrading conditions; and allowing the layers to shield the particles from the chemically degrading conditions such that the particles exhibit robustness, under the conditions, greater than identical particles absent the layers.

According to a further aspect of the present invention there is provided a multicomponent oxide useable as a lithium intercalation material including a multiphase oxide core and a surface layer of one material, which is a component of the multiphase oxide core, that protects the underlying intercalation material from chemical dissolution or reaction.

According to a further aspect of the present invention there is provided a multicomponent oxide into which lithium can be reversibly intercalated, and in which part or all of one constituent of the multicomponent oxide spontaneously forms a surface layer which protects the underlying intercalation compound against chemical dissolution or reaction.

According to a further aspect of the present invention there is provided a composition of the formula $Li_xAl_yMn_{1-y}O_2$ structure, wherein y is non zero.

According to a further aspect of the present invention there is provided an electrode for a primary lithium battery having at least one component, at least one component having a $Li_xAl_yMn_{1-y}O_2$ orthorhombic structure, wherein y is non zero.

According to a further aspect, the composite intercalation material comprises at least two compounds. At least one compound has an orthorhombic structure $Li_xAl_yMn_{1-y}O_2$, where y is nonzero.

According to a further aspect, a composite intercalation material comprising at least two compounds has at least one compound, which upon electrochemical cycling, has a transformation in the voltage vs. capacity curve from a single plateau at about 4 V to two plateaus at about 4 V and 3 V respectively.

According to a further aspect, a composite intercalation material comprising at least two compounds has at least one compound having a discharge capacity of at least about 100 mAh/g over the voltage range 2.0–4.4 V, and an energy density of at least about 400 Wh/kg after 50 cycles.

According to a further aspect, a composite intercalation compound containing at least two individual intercalation compounds is provided where each compound has a different lithium chemical diffusion rate and a voltage vs. capacity profile that varies more continuously than the voltage vs. capacity profile of any noncomposite intercalation compound.

According to a further aspect, a composite intercalation compound containing at least two individual intercalation compounds is provided where each compound has a different particle size and a voltage vs. capacity profile that varies more continuously than the voltage vs. capacity profile of any noncomposite intercalation compound.

Other aspects of the present invention may become apparent from the following description which is given by way of example only and with reference to the accompanying figures.

DETAILED DESCRIPTION OF THE INVENTION

Figure 1A:
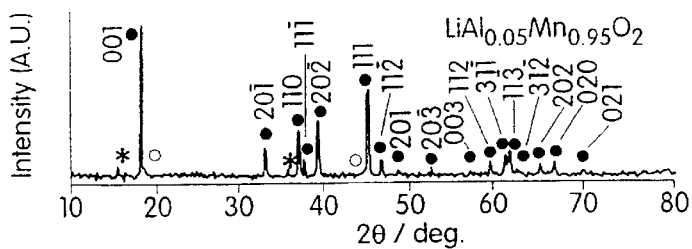
FIGS. 1(A–F) shows powder X-ray diffraction patterns of $Li_xAl_yMn_{1-y}O_2$ prepared according to Example 1 after firing for 2 h at 945° C. in various oxygen partial pressures (filled circles: m-LiMnO$_2$ with hkl indicated; *: o-LiMnO$_2$; +: LiMn$_2$O$_4$; unfilled circles: Li$_2$MnO$_3$; unfilled squares; –LiAlO$_2$). The top pattern for $LiAl_{0.05}Mn_{0.95}O_2$ corresponds to $P_{O2}=10^{-7}$ atm firing conditions.
Figure 1B:
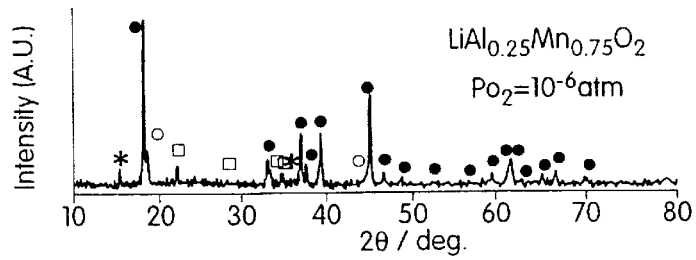
Figure 1C:
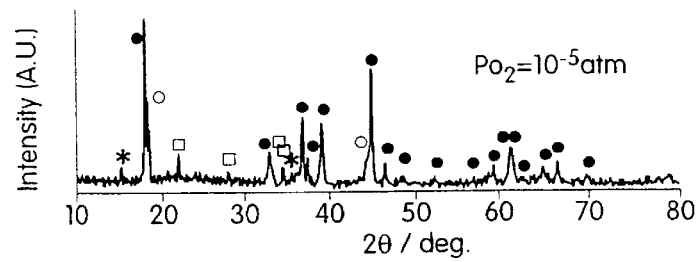
Figure 1D:
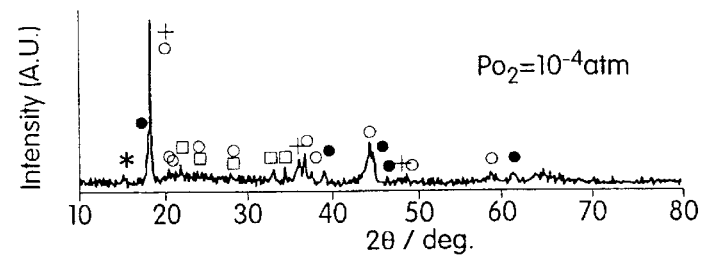
Figure 1E:
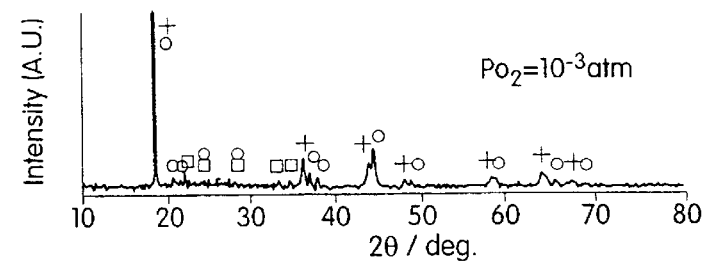
Figure 1F:
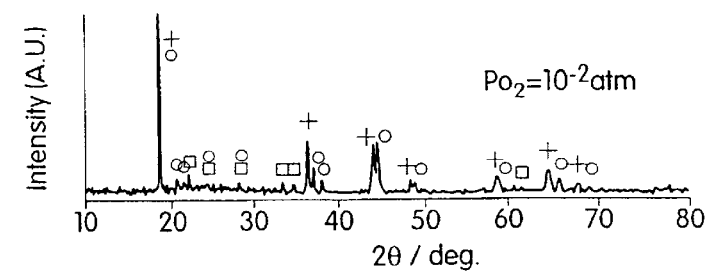
Figure 2A:
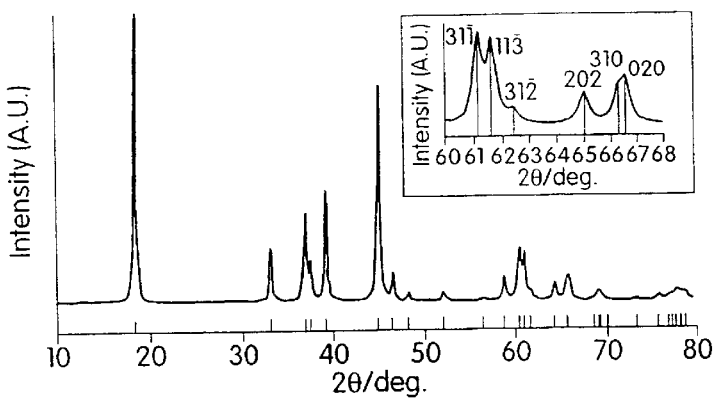
FIGS. 2(A–D) shows simulated X-ray diffraction patterns for (a) m-LiMnO$_2$ (b) m-LiAl$_{0.25}$Mn$_{0.75}$O$_2$ and (c) Li$_2$Mn$_2$O$_4$ compared with (d) the experimental pattern for LiAl$_{0.25}$Mn$_{0.75}$O$_2$ prepared according to Example 1.
Figure 2B:
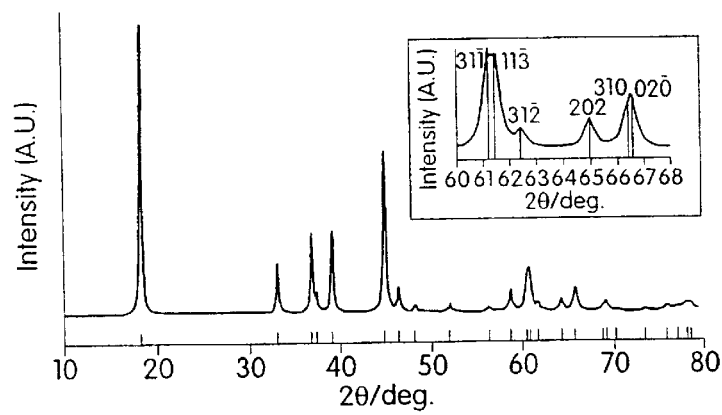
Figure 2C:
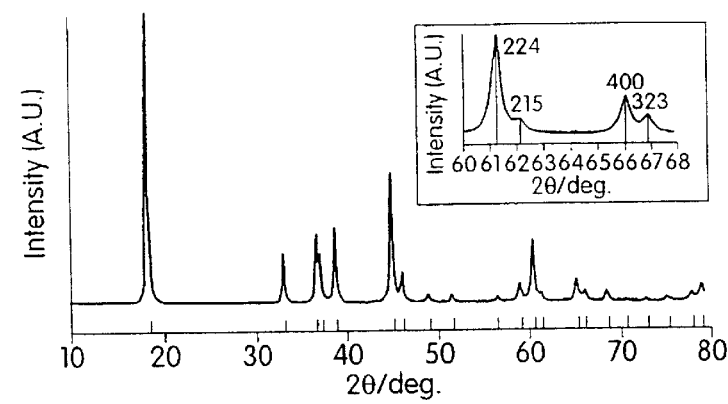
Figure 2D:
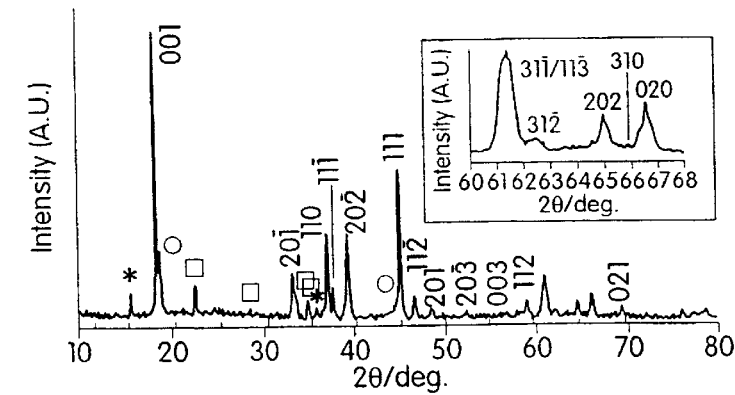

One embodiment of the invention provides a family of intercalation compounds having the composition $Li_xAl_yMn_{1-y}O_2$ where y is less than about 0.5. These compounds can be used as electrodes in lithium batteries and preferably have an x value of about 1 as synthesized by methods described herein. These compounds crystallize in the monoclinic LiMnO$_2$, the orthorhombic LiMnO$_2$ or the tetragonal spinel Li$_2$Mn$_2$O$_4$ structure types, and have other structural characteristics, and performance characteristics associated with those structural characteristics, described herein. In one compound, ions predominantly occupy sites that are octahedrally coordinated by oxygen. Upon cyclic electrochemical intercalation and de-intercalation in a lithium rechargeable battery, the compounds exhibit a charge in local cation order where the Li ions thereafter occupy sites of both octahedral and tetrahedral oxygen coordination, the extent of change depending on the concentration of Li in the compound. The structure of the compound attained after electrochemical cycling can be, but is not limited to, that of the cubic spinel LiMn$_2$O$_4$ or the tetragonal spinel Li$_2$Mn$_2$O$_4$. The compounds of this invention exhibit a combination of useful characteristics not found in intercalation compounds typically used previously in rechargeable lithium batteries such as LiCoO$_2$, LiMn$_2$O$_4$ (cubic spinel structure), and LiNiO$_2$ including low materials cost, high reversible charge capacity and energy density at room temperature, high reversible charge capacity and energy density at elevated temperatures (40–70° C.), long life upon storage at elevated temperatures (40–70° C.), and safety, as manifested by the absence of highly exothermic reactions upon heating of a rechargeable lithium battery containing the compound.

Another embodiment of the invention also comprises any lithium battery, of primary or secondary (rechargeable) type, including those described herein, that utilizes the compounds of the invention.

Another embodiment of the invention comprises any mixture of the aforementioned individual $Li_xAl_yMn_{1-y}O_2$ compounds, and any mixtures of compounds with composition $Li_xAl_yMn_{1-y}O_2$ with other known intercalation compounds such as $LiCoO_2$, $LiAl_yCo_{1-y}O_2$, $LiNiO_2$, $LiCo_yNi_{1-y}O_2$, or $LiMn_2O_4$. Such a mixture can have particular utility because of a voltage that varies more smoothly with charge capacity than is attained for certain individual compounds.

The following abbreviations are used in this document: Monoclinic $Li_xAl_yMn_{1-y}O_2$ (abbreviated m-$Li_xAl_yMn_{1-y}O_2$) Orthorhombic $Li_xMnO_2$ (abbreviated o-$Li_xMnO_2$) Orthorhombic $Li_xAl_yMn_{1-y}O_2$, (abbreviated o-$Li_xAl_yMn_{1-y}O_2$)

In each instance the intercalation compound is prepared with a value of x of about 1. During use as an intercalation compound the value of x can approach 0 (e.g., during charging of a battery utilizing the compound as the active cathode material). In one embodiment, for the monoclinic $Li_xAl_yMn_{1-y}O_2$, y has a value of between about 0.01 and about 0.5. In another embodiment, for orthorhombic $Li_xAl_yMn_{1-y}O_2$, y has a value of between about 0 and about 0.25. Where y=0, the compound is undoped orthorhombic $Li_xMnO_2$.

Herein the term "orthorhombic $LiMnO_2$" or "o-$LiMnO_2$" refers to $Li_xMnO_2$ of the orthorhombic ordered rocksalt structure described by R. Hoppe, G. Brachtel, and M. Jansen (Z. Anorg. Allg. Chemie, 471, 1 (1975)).
Monoclinic $Li_xAl_yMn_{1-y}O_2$ One embodiment of this invention reflects the discovery that addition of Al to form an intercalation compound $LiAl_yM_{1-y}O_2$ allows the stabilization of the α-$NaFeO_2$ structure type for a compound which as pure $LiMO_2$ is not easily formed in this structure. Here M can be but is not limited to Mn, Fe, and Ti. For instance, $LiMnO_2$ can be crystallized in the orthorhombic symmetry phase as a pure compound, or as the tetragonal spinel $Li_2Mn_2O_4$ by electrochemical or chemical insertion of Li into the spinel $LiMn_2O_4$, but has only been formed in the α-$NaFeO_2$ structure type (which in this composition has monoclinic symmetry, space group C2/m) by the ionic exchange of $Li^+$ for $Na^+$ in $NaMnO_2$ (A. R. Armstrong and P. G. Bruce, Nature, Vol. 381, p. 499, 1996). By the methods of this invention, as shown in Example 1, a solid solution Li(Al, Mn)$O_2$ can be readily crystallized in the monoclinic variant of the α-$NaFeO_2$ structure type by heating in a reducing gas environment.

The intercalation compound $LiAl_yM_{1-y}O_2$ which is crystallized in the monoclinic variant of the α-$NaFeO_2$ structure type, forms upon electrochemical cycling an intercalation compound with two characteristic voltages of intercalation, a high energy density, and excellent cycling performance. In particular, this intercalation compound can be cycled over voltage and capacity ranges which include plateaus at both about 4V and about 3V (against a Li metal anode), similar to that of spinels based on Li—Mn—O, but without the loss of capacity upon cycling that is characteristic of previous spinels. This allows practical utilization of both voltage regimes, and consequently results in a higher practical energy density.

It is a feature that compounds of the invention exhibit high energy density and reversible capacity upon repeated cycling at elevated temperatures of 40–70° C., a significantly useful improvement in the art. In one embodiment, the energy density can be higher at elevated temperatures than that exhibited by the same compound at room temperature. The elevated temperature stability of the compound is markedly superior to that of typical lithium manganese oxides.

The invention encompasses methods of making such compounds as well.

EXAMPLE 1

Synthesis of Monoclinic $LiAl_{0.05}Mn_{0.95}O_2$ and $LiAl_{0.25}Mn_{0.75}O_2$ by Hydroxide Precipitation and Freeze-drying, and Firing in a Reducing Gas Atmosphere, Structural Characterization of Same, and Electrochemical Testing of Same at Room Temperature and Elevated Temperature Synthesis and Structural Analysis Monoclinic $Li_xAl_yMn_{1-y}O_2$ of overall compositions $LiAl_{0.05}Mn_{0.95}O_2$ and $LiAl_{0.25}Mn_{0.75}O_2$ were prepared by a co-precipitation and freeze-drying synthesis procedure. $LiOH.H_2O$ (Alfa Aesar, 98%), $Mn(NO_3)_3.6H_2O$ (Aldrich, 98%) and $Al(NO_3)_3.9H_2O$ (Alfa Aesar, 98%) were used to prepare precursors with the aluminum levels y=0.05 and y=0.25, and with an overall Li:(Mn+Al) atomic ratio of 1.05:1. The slight excess of Li was included to compensate for possible loss of Li during firing. Mixed manganese-aluminum hydroxide was co-precipitated from mixed aqueous solutions of $Mn(NO_3)_3.6H_2O$ and $Al(NO_3)_3.9H_2O$ by adding a 0.2 M solution (including both metal nitrates) dissolved in deionized water in the desired molar ratio (y/(1−y)) to a continuously stirred solution of $LiOH.H_2O$ in deionized water kept at pH=10.5. The precipitate was allowed to digest for 12 h, was settled by centrifugation, and then residual nitrate ions were removed by dispersing the precipitate in aqueous $LiOH.H_2O$ solution, settling the precipitate by centrifugation, and decanting of the supernatant liquid. This rinsing process was carried out five times. The rinsed precipitate was dispersed a final time in an aqueous solution containing dissolved $LiOH.H_2O$ at a concentration which yielded an overall composition with a Li to Al+Mn ratio of 1.05, and freeze-dried by spraying the suspension into liquid nitrogen, removing the frozen droplets, and freeze-drying in a commercial freeze drier (VirTis Consol 12LL, Gardiner, N.Y.).

The precursor powders were fired for 2 h at 945° C. in various partial pressures of oxygen and furnace-cooled to room temperature. The effect of oxygen partial pressure on the phase stability was determined by firing in the range $PO_2=10^{-2}–10^{-7}$ atm, controlled by flowing pre-mixed argon/oxygen or $CO/CO_2$ mixtures. By firing in argon, argon/oxygen, or a buffered $CO/CO_2$ mixture, a high $Mn^{3+}$ fraction was obtained, and a crystal structure isomorphous with monoclinic $LiMnO_2$ was obtained in the $Li_xAl_yMn_{1-y}O_2$.

The structure of m-$Li_xAl_yMn_{1-y}O_2$ was confirmed through X-ray powder diffraction and structure simulation using commercial software. X-ray diffraction scans of the oxide powders obtained by firing the aluminum-doped precursors at 945° C. in various oxygen partial pressures are shown in FIG. 1. Considering first the composition $LiAl_{0.25}Mn_{0.75}O_2$, at the higher oxygen partial pressures of $10^{-2}$ and $10^{-3}$ atm, the resulting phases are $LiMn_2O_4$, $Li_2MnO_3$ and γ-$LiAlO_2$ (tetragonal phase). As the oxygen partial pressure is reduced to $10^{-4}$ atm, new phases isostructural with m-$LiMnO_2$ and o-$LiMnO_2$ appear. m-$LiMnO_2$, marked by its strongest peak at 2θ=18.3°, becomes the major phase at oxygen partial pressures below $10^{-5}$ atm. The identification of this phase is discussed in greater detail below. The amount of o-LiMnO$_2$ also increases slightly as the oxygen partial pressure decreases between 10$^{-4}$ and 10$^{-6}$ atm, but it remains a minor phase throughout at a firing temperature of about 945° C. The composition LiAl$_{0.05}$Mn$_{0.95}$O$_2$, exhibited exclusively the m-LiMnO$_2$ phase when fired in reducing atmosphere at this temperature (PO$_2$=10$^{-7}$ atm, FIG. 1). The phases show that the predominant manganese valence state is 3+ at oxygen partial pressures below 10$^{-4}$ atm, and that under these conditions, a solid solution between the LiAlO$_2$ and LiMnO$_2$ endmembers is achieved. However, unlike either pure endmember under these firing conditions, the structure is that of m-LiMnO$_2$.

Careful phase identification is necessary in this system, since the XRD pattern of m-LiMnO$_2$ is very similar to that of tetragonal Li$_2$Mn$_2$O$_4$ spinel. The latter spinel phase has been obtained by lithiation of LiMn$_2$O$_4$ spinel (J. M. Tarascon and D. Guyomard, J. Electrochem. Soc., 138, 2864 (1991)). Capitaine et al. (F. Capitaine, P. Gravereau, and C. Delmas, Solid State Ionics, 89, 197 (1996)) have argued that the monoclinic and tetragonal phases can be distinguished from each other by the diffraction lines in the 64–68 ° 2θ range. We simulated the XRD patterns of m-LiMnO$_2$, Li$_2$Mn$_2$O$_4$, and a hypothetical solid solution m-LiAl$_{0.25}$Mn$_{0.75}$O$_2$, using the commercial software Cerius (v.3.5, Molecular Simulations Inc., San Diego, Calif.). The structure of m-LiMnO$_2$ was simulated using crystallographic data from Armstrong and Bruce (A. R. Armstrong and P. G. Bruce, Nature, 381, 499 (1996)) that for Li$_2$Mn$_2$O$_4$ using data from Mosbah et al. (A. Mosbah, A. Verbaere, and M. Tournoux, Mat. Res. Bull., 18, 1375 (1983)) and that for m-LiAl$_{0.25}$Mn$_{0.75}$O$_2$ using the lattice parameters determined in this study (see below) and the Armstrong and Bruce oxygen parameters, assuming completely ordered α-NaFeO$_2$ structure except for the substitution of 25% of the Mn by Al.

The simulated results are shown in FIG. 2 in comparison with the experimental XRD pattern for LiAl$_{0.25}$Mn$_{0.75}$O$_2$. Differences between the three simulated patterns can be seen in the positions and relative intensities of peaks in the 60–68° range, expanded in the inset for each pattern. The monoclinic phases, m-LiMnO$_2$ and m-LiAl$_{0.25}$Mn$_{0.75}$O$_2$, exhibit (202) and (020) peaks at 65.1° and 66.6° respectively, with the latter being of higher intensity. Li$_2$Mn$_2$O$_4$ has (400) and (323) peaks at 66.1° and 67.0° respectively, with the former being of higher intensity. The experimental pattern in FIG. 2(d) exhibits peak positions (65.1° and 66.6°) as well as relative intensities that correspond to the monoclinic phase.

Another distinguishable feature between the different phases is observed in the range 61–62°. m-LiMnO$_2$ has two peaks (311) and (113), which become more closely spaced in m-LiAl$_{0.25}$Mn$_{0.75}$O$_2$. Li$_2$Mn$_2$O$_4$ has only one peak (224) in this 2θ range. The experimental pattern (FIG. 2(d)) matches the simulation for m-LiAl$_{0.25}$Mn$_{0.75}$O$_2$, not that for m-LiMnO$_2$. Thus these results confirm not only that the m-Li$_x$Al$_y$Mn$_{1-y}$O$_2$ compounds of this invention have the monoclinic structure, but also that they indeed have Al substituted for Mn.

Figure 3:
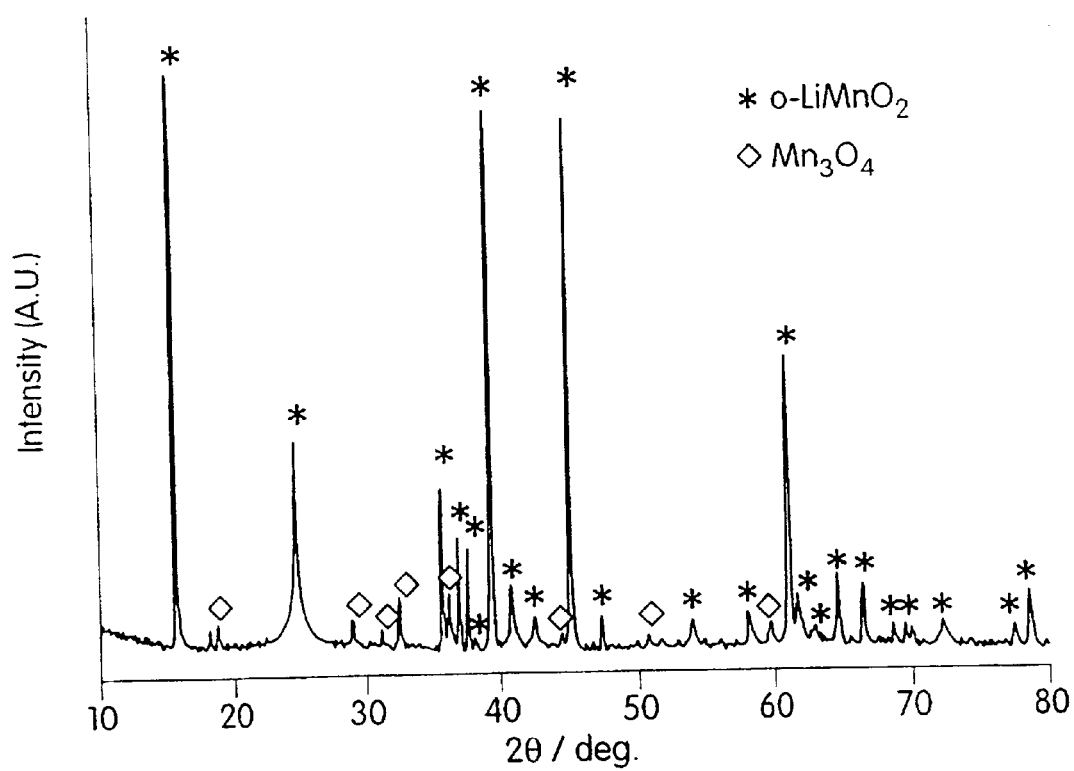
FIG. 3 shows the powder X-ray diffraction pattern of undoped precursor prepared according to Example 1 after firing for 2 h at 945° C. and $P_{O2}=10^{-6}$ atm (*: o-LiMnO$_2$; Mn$_3$O$_4$).

As further support of the effect of Al doping, FIG. 3 shows the XRD pattern of an undoped LiMnO$_2$ sample obtained by firing a precursor prepared identically but without Al additive at 945° C. in 10$^{-6}$ atm oxygen partial pressure. o-LiMnO$_2$ is indeed seen to be the predominant phase.

The lattice parameters of the m-LiAl$_{0.25}$Mn$_{0.75}$O$_2$ sample have been calculated from the XRD data using Cohen's least-squares method, and are compared with those for pure m-LiMnO$_2$ obtained by the ion-exchange method in Table 1. No significant differences are found in the values of b and β, while α and c are slightly decreased.

TABLE 1

| | m-LiAl$_{0.25}$Mn$_{0.75}$O$_2$ (This study) | m-LiMnO$_2$ (published) | m-LiMnO$_2$ (published) | m-LiMnO$_2$ (published) |
|---|---|---|---|---|
| a | 5.426 ± 0.003 Å | 5.4387(7) Å | 1.439(3) Å | 5.431(6) Å |
| b | 2.806 ± 0.001 Å | 2.80857(4) Å | 2.809(2) Å | 2.809(2) Å |
| c | 5.384 ± 0.003 Å | 5.3878(6) Å | 5.395(4) Å | 5.390 Å |
| β | 115.96 ± 0.03° | 116.006(3)° | 115.9(4)° | 115.95(7)° |

The stabilization of m-LiAl$_y$Mn$_{1-y}$O$_2$ phase is most likely due to the addition of aluminum and not to the firing conditions alone. We also note that the α-NaFeO$_2$ polymorph of LiAlO$_2$(α-LiAlO$_2$) is not the stable phase under these conditions because it has been previously shown that this polymorph irreversibly transforms to γ-LiAlO$_2$ above 600° C. The present Li$_x$Al$_y$Mn$_{1-y}$O$_2$ solid solution is therefore seen to crystallize in the α-NaFeO$_2$ structure under conditions where neither endmember, LiAlO$_2$ nor LiMnO$_2$, is stable in this structure. This discovery is surprising in view of the prior art.

Figure 4:
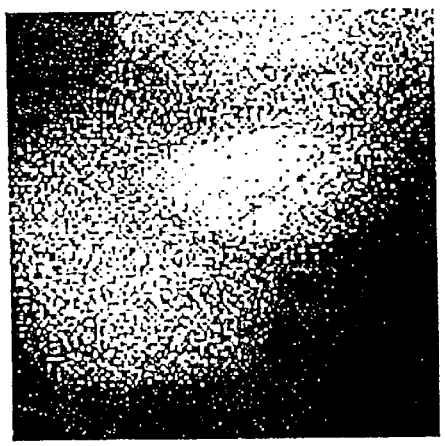
FIG. 4 shows a photocopy of a bright-field scanning transmission electron microscopy image of powder particles of m-LiAl$_{0.05}$Mn$_{0.95}$O$_2$ prepared according to Example 1 along with energy dispersive X-ray maps showing Al and Mn distributions.
Figure 4:
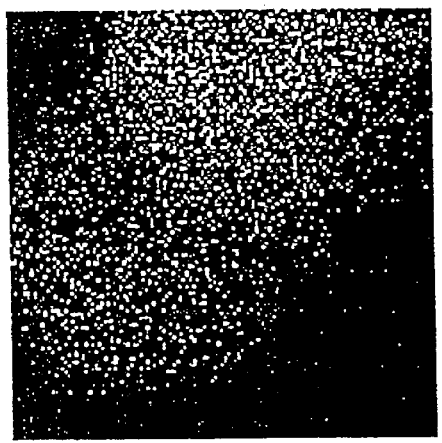
Figure 4:
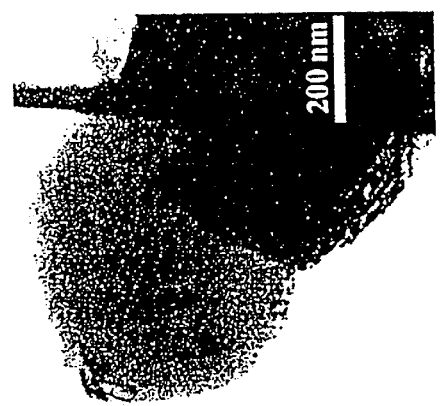

The formation of an Al and Mn solid solution in the compounds of this invention can be evidenced by transmission electron microscopy (TEM) and compositional mapping in scanning transmission electron microscopy (STEM). As-prepared m-LiAl$_{0.05}$Mn$_{0.95}$O$_2$ powder was analyzed in the Vacuum Generators HB 603 STEM. Bright-field and annular-dark field imaging and energy dispersive X-ray mapping for Al and Mn was conducted. FIG. 4 shows a bright-field image of the powder particles, along with the X-ray maps showing Al and Mn distribution. The presence of Mn appears to be always accompanied by the presence of Al with a constant relative Al/Mn x-ray intensity ratio throughout the powder particles. This shows that the initial composition is most likely uniform. X-ray photoelectron spectroscopy (XPS) was used to analyze the surface composition of this powder, before and after ion-sputtering to remove the surface layer. The XPS results showed no significant difference in the Al/Mn ratio before and after sputtering, showing that there is not initially a surface atomic layer of a different composition. Thus the excellent intercalation properties of this compound, discussed later, may be the resulting formation of a true solid solution m-LiAl$_y$Mn$_{1-y}$O$_2$.

Figure 5:
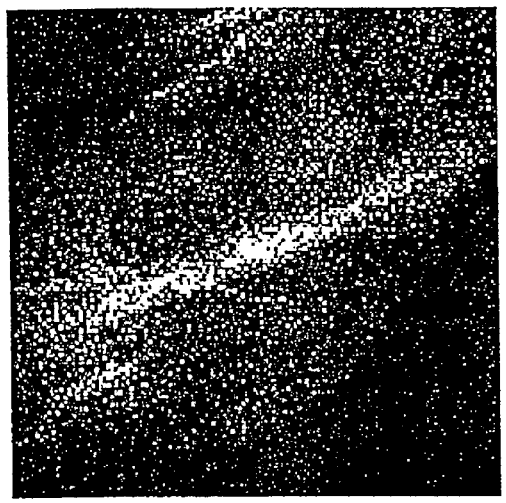
FIGS. 5 and 6 show a photocopy of a bright field scanning transmission electron microscopy images of powder particles of m-LiAl$_{0.25}$Mn$_{0.75}$O$_2$ prepared according to Example 1 after storage at room temperature for six months, along with energy dispersive X-ray maps showing Al and Mn distributions.
Figure 5:
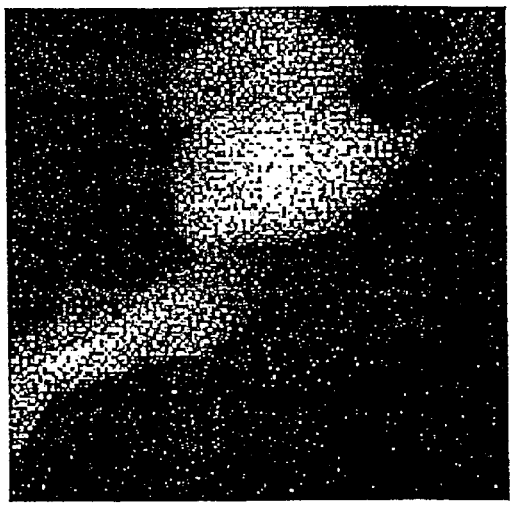
Figure 5:
Figure 6:
Figure 6:
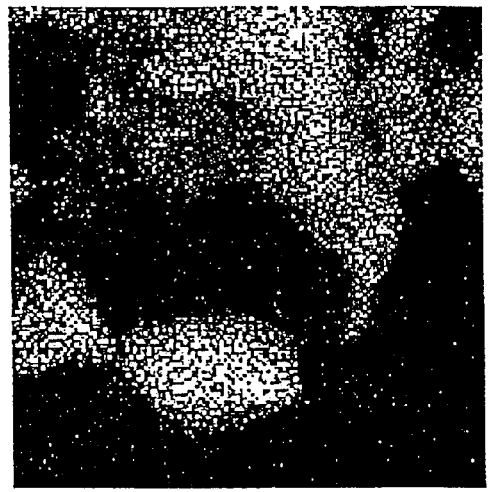
Figure 6:
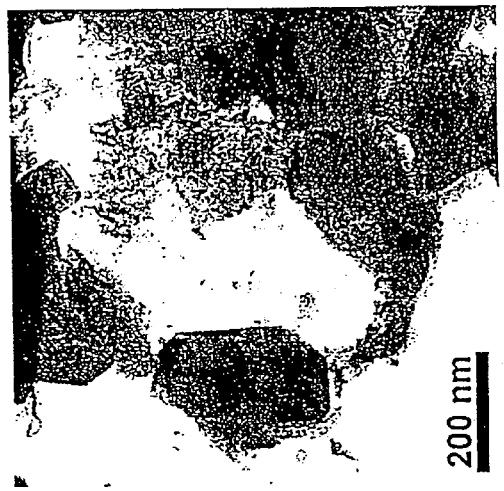
Figure 7A:
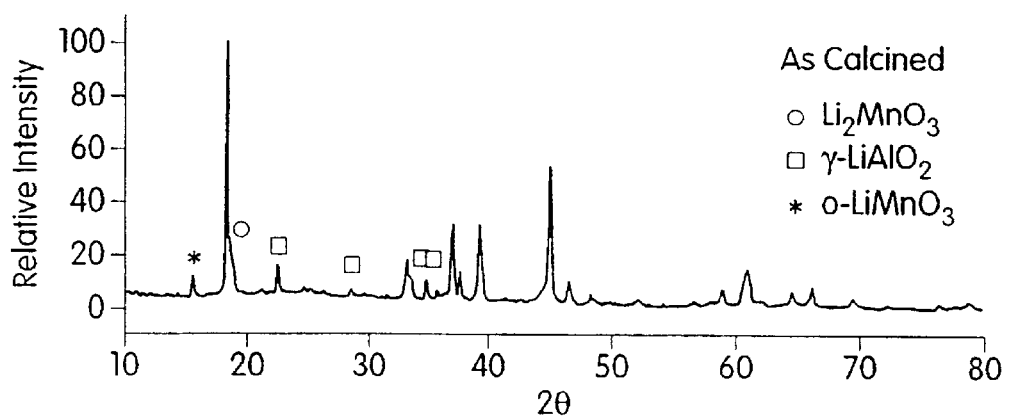
FIGS. 7(A–B) compares powder X-ray diffraction patterns of m-LiAl$_{0.25}$Mn$_{0.75}$O$_2$ prepared according to Example 1 before and after storage at room temperature for six months.
Figure 7B:
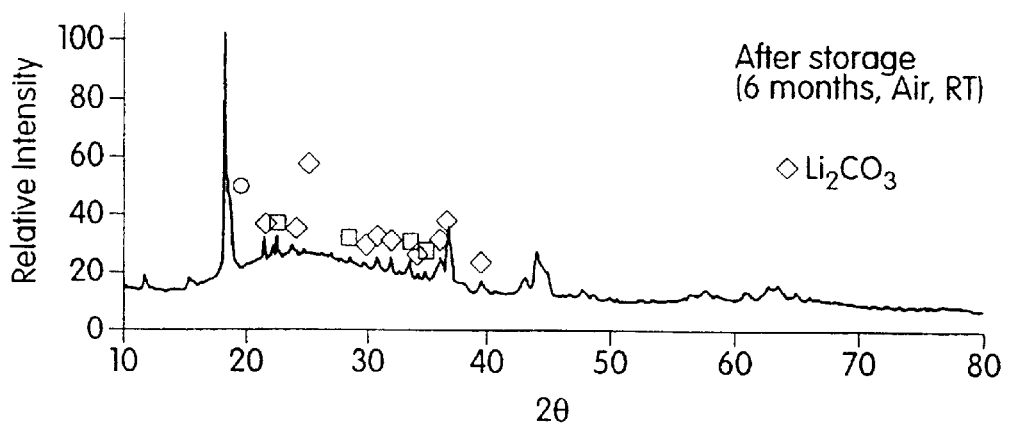

A maximum amount of Al which is soluble in the structure of m-LiAl$_y$Mn$_{1-y}$O$_2$ may be limited. FIGS. 5 and 6 show STEM images and X-ray composition maps of a LiAl$_{0.25}$Mn$_{0.75}$O$_2$ powder after storage at room temperature in a sealed container for 6 months. Separation of the powder into distinct Al-rich and Mn-rich regions is observed. Analysis of the energy-dispersive X-ray spectrum showed that approximately 5 atom % of the Al remains in the mixed solid solution m-LiAl$_y$Mn$_{1-y}$O$_2$. FIG. 7 shows X-ray diffraction results from this powder before and after storage. A broad background, which can indicate the presence of an amorphous phase, has appeared after storage. The peak intensities and peak positions for the monoclinic α-NaFeO$_2$ phase have also changed. These results show that an m-Li$_x$Al$_y$Mn$_{1-y}$O$_2$ solid solution has a tendency towards phase separation into Al-rich and Mn-rich oxides, even at room temperature.

Such a separation will also tend to occur during electrochemical cycling, leading to a structure in which the Al-rich oxide possibly protects the Mn-rich oxide from exposure to surrounding media including the electrolyte in a rechargeable lithium battery. The spontaneous separation of the aluminum component in the form of a surface layer can then protect and stabilize the underlying intercalation compound against dissolution and chemical attack in the environment of a lithium ion battery, thereby contributing to increased charge capacity, less capacity fade upon cycling, and increased stability against capacity loss at elevated temperatures.

Other components of a multicomponent oxide intercalation compound that spontaneously separate can also serve the protective role that aluminum oxide/hydroxide does in this instance. Other such components include boron oxide, phosphorus oxide, silicon oxide, and oxides of the 3d metals.

Room Temperature Electrochemical Properties

The intercalation compounds were tested in electrochemical test cells including two stainless steel electrodes with a Teflon holder. Cathodes were prepared by mixing together the oxide powders, carbon black (Cabot), graphite (TIMCAL America) and poly(vinylidene fluoride) (PVDF) (Aldrich) in the weight ratio of 78:6:6:10. PVDF was pre-dissolved in γ-butyrolactone (Aldrich) before mixing with the other components. After the γ-butyrolactone was evaporated at 150° C. in air, the components were compacted at about 4 t/cm$^2$ pressure to form pellets 10–25 mg in weight and 0.5 cm$^2$ in cross-sectional area. The pellets were then dried at 140° C. under primary vacuum for 24 h and transferred into an argon-filled glove box. Lithium ribbon of 0.75 mm thickness (Aldrich) was used as the anode. The separator was a film of Celgard 2400™ (Hoechst-Celanese, Charlotte, N.C.), and the electrolyte consisted of a 1 M solution of $LiPF_6$ in ethylene carbonate (EC) and diethylene carbonate (DEC). The ratio of EC to DEC was 1:1 by volume. All cell handling was performed in an argon-filled glove box. Charge-discharge studies were performed with a MACCOR automated test equipment (Series 4000). The cells were charged and discharged between the voltage limits of 2.0 and 4.4 V.

Figure 8:
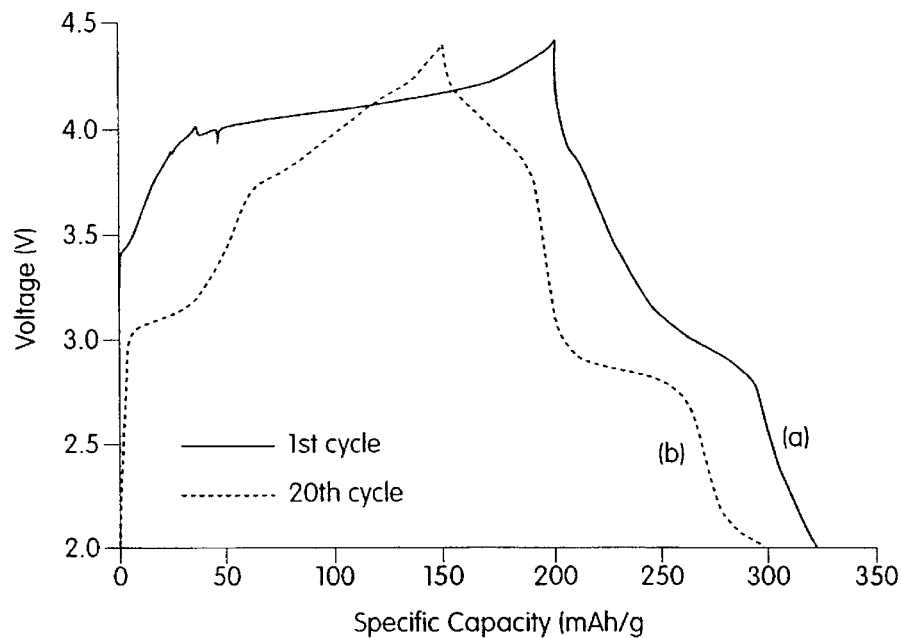
FIG. 8 shows the charge-discharge curves for an electrochemical test cell containing m-LiAl$_{0.25}$Mn$_{0.75}$O$_2$ according to Example 1 at 0.4 mA/cm$^2$ current density (c/5 rate) between 2.0 and 4.4 V, on (a) cycle 1, and (b) cycle 20.
Figure 9:
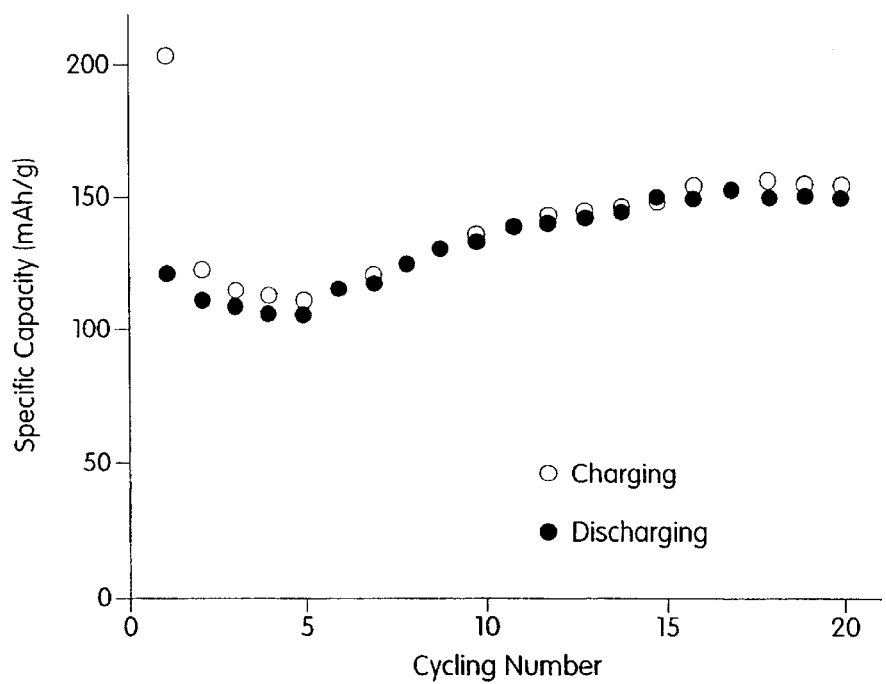
FIG. 9 shows the specific capacity vs. cycle number for an electrochemical test cell containing m-LiAl$_{0.25}$Mn$_{0.75}$O$_2$ according to Example 1, at 0.4 mA/cm$^2$ current density (c/5 rate) between 2.0 and 4.4 V.
Figure 10:
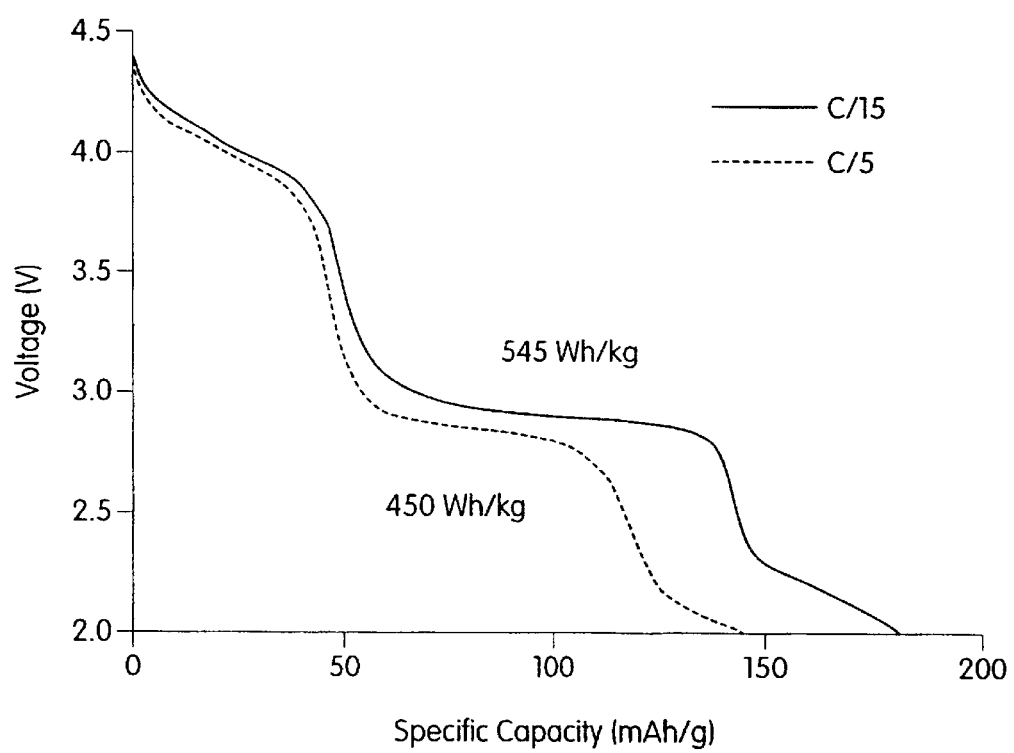
FIG. 10 shows discharge curves at C/5 and C/15 rates for an electrochemical test cell containing m-LiAl$_{0.25}$Mn$_{0.75}$O$_2$ cycled as described in Example 1.

FIG. 8 shows the first charge-discharge curve (C/5 rate) of a cell prepared using m-$LiAl_{0.25}Mn_{0.75}O_2$ (fired at 945° C., $PO_2=10^{-6}$ atm) as the cathode and lithium metal as the anode. It can be seen that the cell exhibits a single charging voltage plateau at ~4.1 V, and has about 203 mAh/g of first-charge capacity. (In all instances herein, the capacity is computed on the basis of the oxide weight.) The first-discharge curve shows a capacity of about 119 mAh/g and the emergence of two voltage steps. After further cycling, the voltage steps become more distinct. FIG. 8 also shows the charge-discharge curve at the 20th cycle, where two plateaus at ~4 V and ~3 V are observed, indicating intercalation at two distinct lithium sites. The m-$LiAl_{0.05}Mn_{0.95}O_2$ composition shows similar room temperature characteristics. Thus the tests show that the monoclinic compounds of this invention are synthesized with both Li and (Al, Mn) cations occupying layers of octahedral sites. Upon electrochemical cycling, the lithium can be inserted into both tetrahedral and octahedral sites. FIG. 9 shows the evolution of the charge and discharge capacities of m-$LiAl_{0.25}Mn_{0.75}O_2$ during cycling between 2.0 and 4.4 V at C/5 rate. While an initial drop in capacity to about 100 mAh/g is seen over the first 5 cycles, with further cycling the discharge capacity increases progressively. and saturates after about 15 cycles at ~148 mAh/g. The fact that cycling can be conducted over both the 4 V and 3 V plateaus without capacity fade is a remarkably different behavior from that of $LiMn_2O_4$ spinel, in which the capacity decreases rapidly upon cycling into the 3 V region. The m-$LiAl_{0.25}Mn_{0.75}O_2$ material was also tested at a lower C/15 rate. To accelerate any cycling fade, the sample was first cycled 12 times at C/5 rate. The 13th cycle at C/15 rate is shown in FIG. 10 in comparison with the result at C/5 rate. It is seen that the reversible capacity increases to 182 mAh/g at the lower rate, with an energy density of 545 Wh/kg. At the C/5 rate, the energy density is 450 Wh/kg.

Elevated-Temperature Electrochemical Properties

Figure 11:
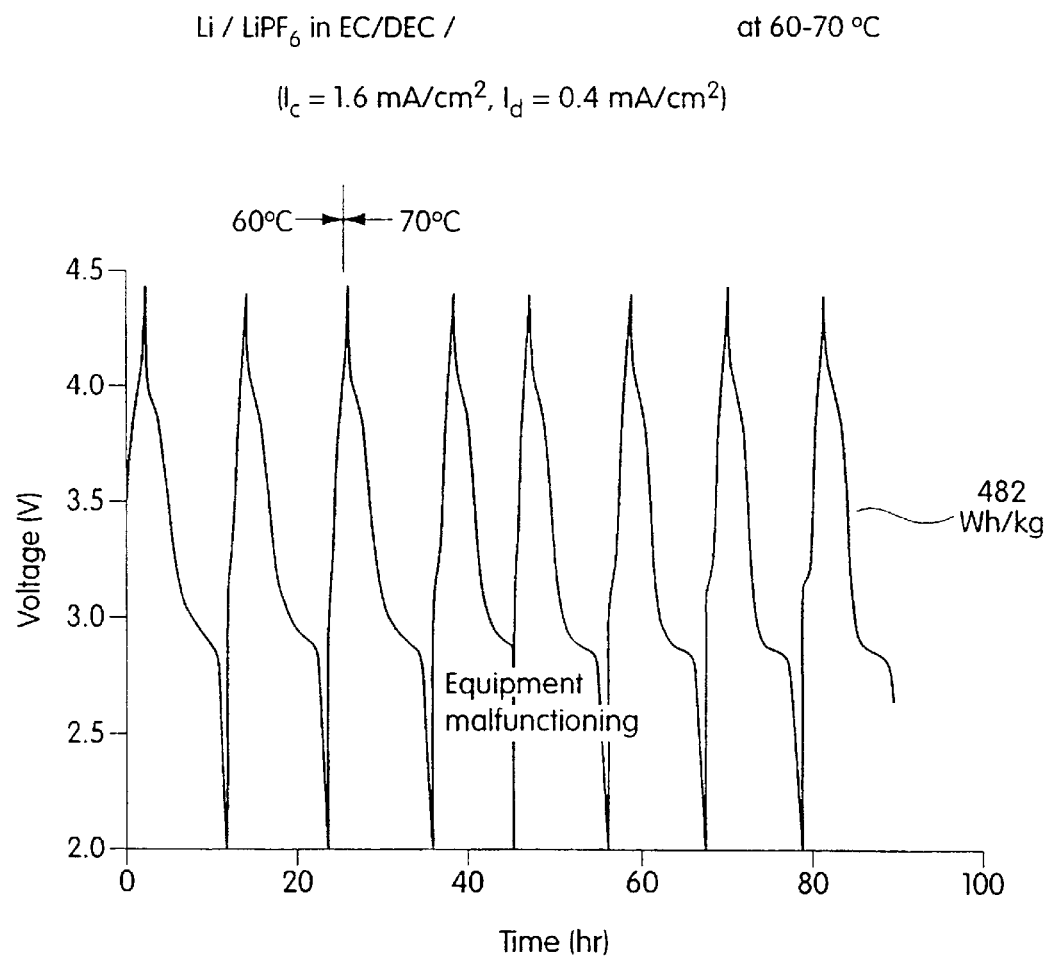
FIG. 11 shows voltage vs. time results for an electrochemical test cell containing m-LiAl$_{0.25}$Mn$_{0.75}$O$_2$ cycled at 60° C. and then 70° C. as described in Example 1.
Figure 12:
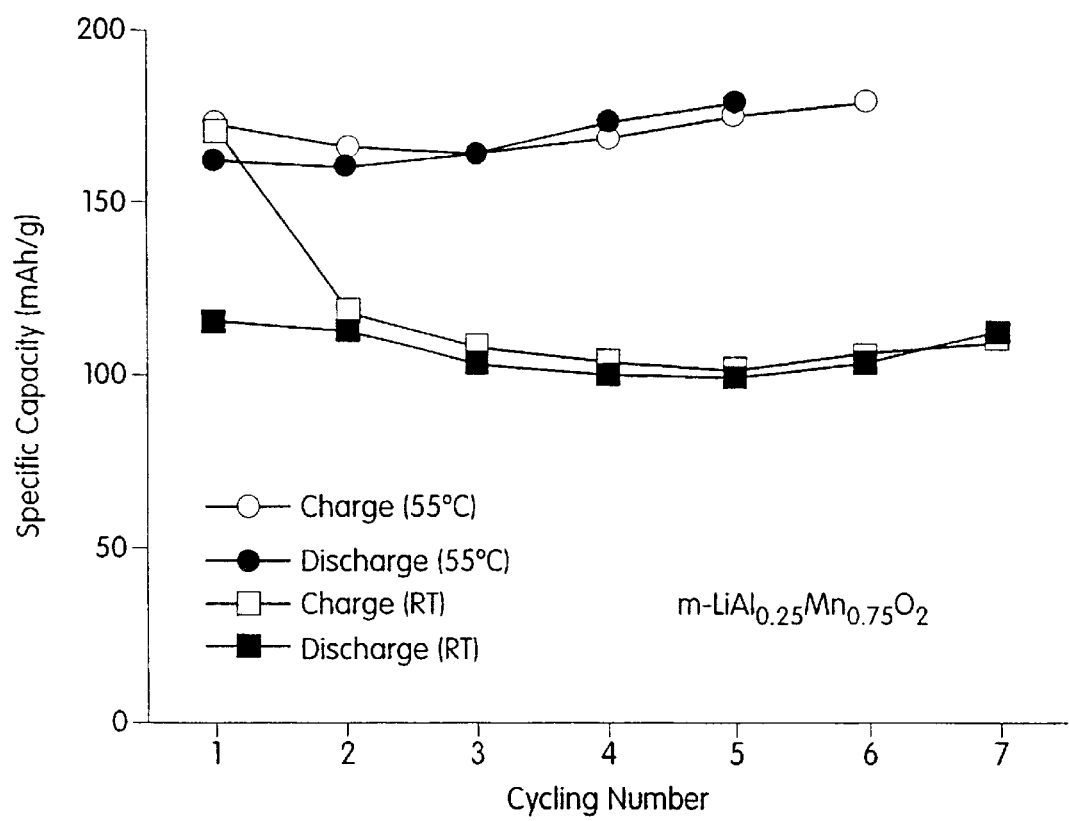
FIG. 12 shows the specific capacity vs. cycle number for an electrochemical test cell containing m-LiAl$_{0.25}$Mn$_{0.75}$O$_2$ according to example 1, at room temperature (23° C.) and 55° C.
Figure 13:
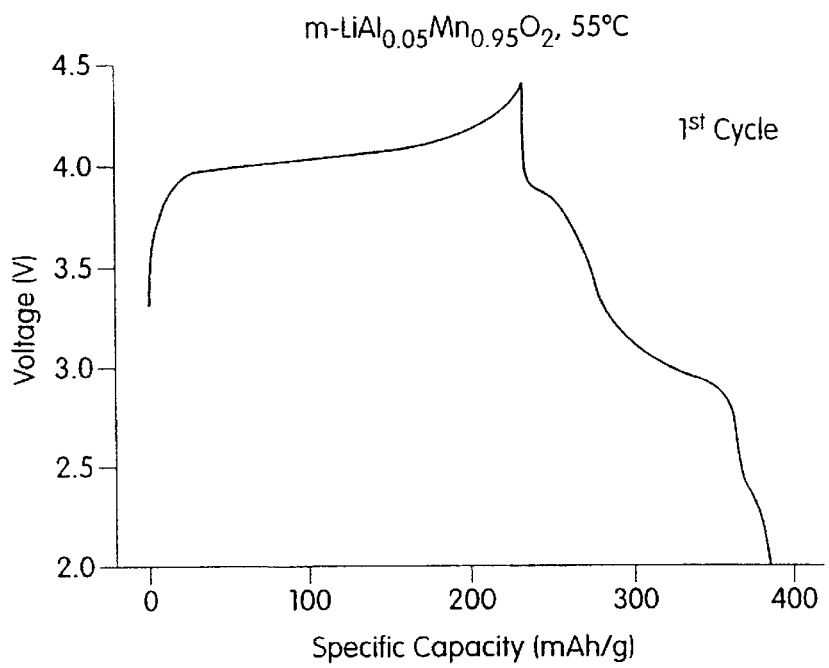
FIG. 13 shows the first charge-discharge curve at 55° C. for an electrochemical test cell containing m-LiAl$_{0.05}$Mn$_{0.95}$O$_2$ according to Example 1.
Figure 14:
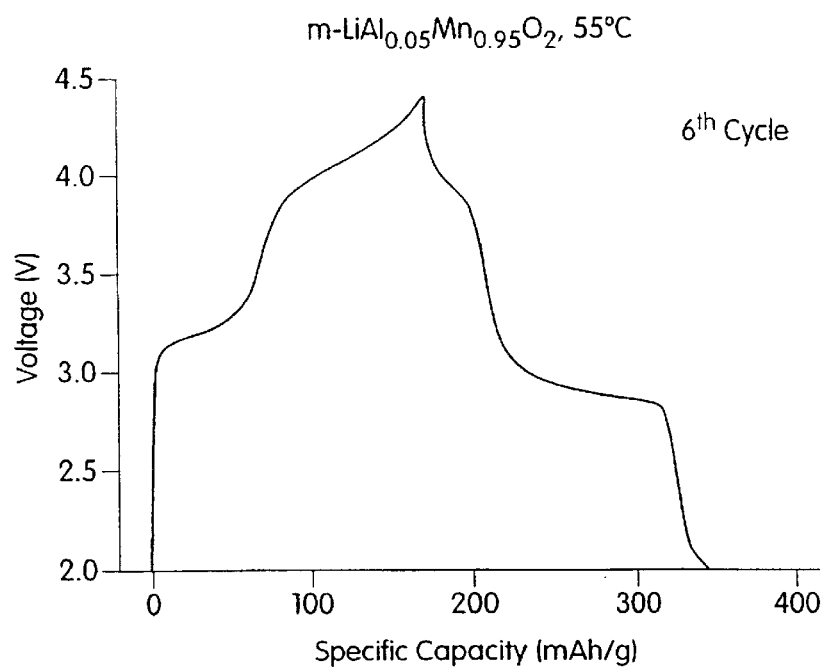
FIG. 14 shows the charge-discharge curve at 55° C., cycle 6, for an electrochemical test cell containing m-LiAl$_{0.05}$Mn$_{0.95}$O$_2$ according to Example 1.
Figure 15:
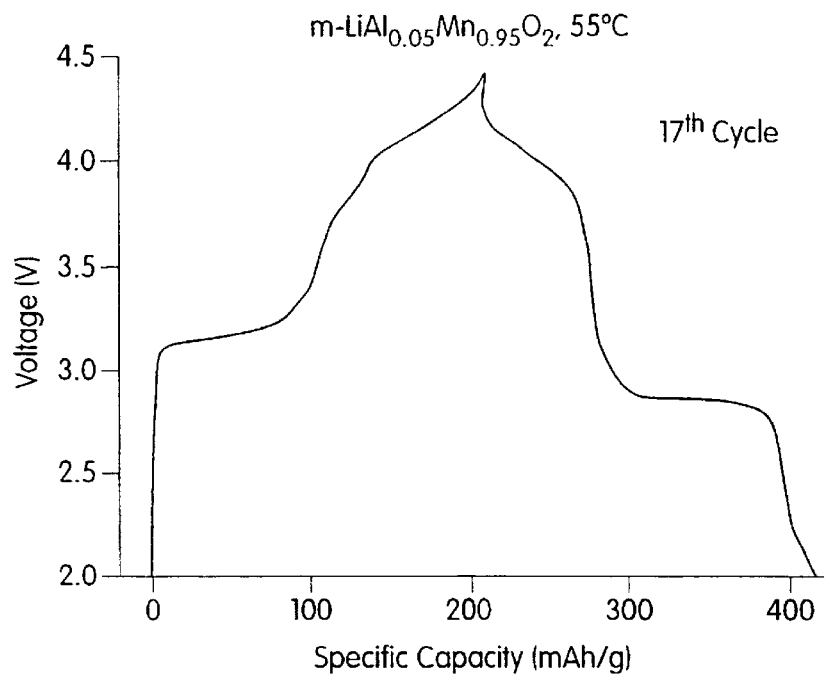
FIG. 15 shows the charge-discharge curve at 55° C., cycle 17, for an electrochemical test cell containing m-LiAl$_{0.05}$Mn$_{0.95}$O$_2$ according to example 1.
Figure 16:
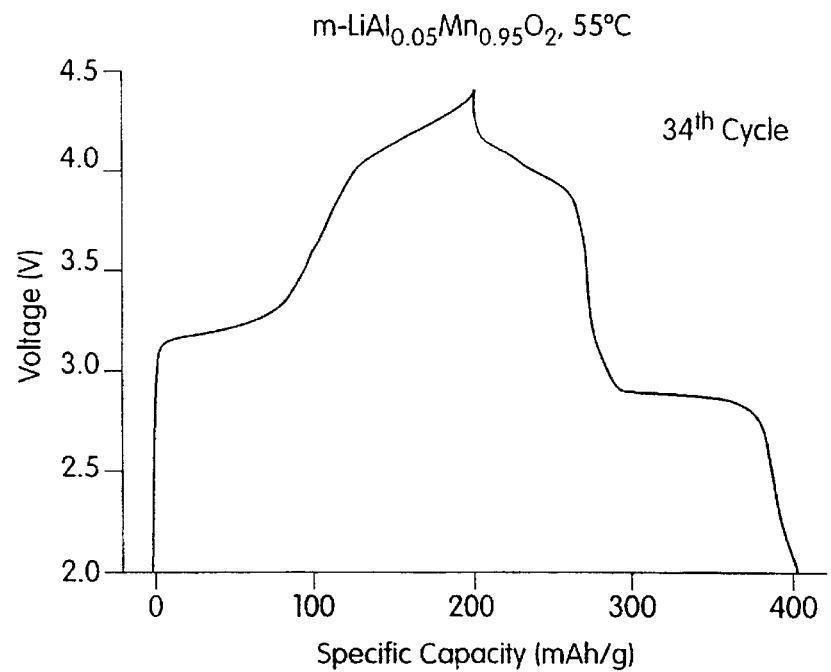
FIG. 16 shows the charge-discharge curve at 55° C., cycle 34, for an electrochemical test cell containing m-LiAl$_{0.05}$Mn$_{0.95}$O$_2$ according to Example 1.
Figure 17A:
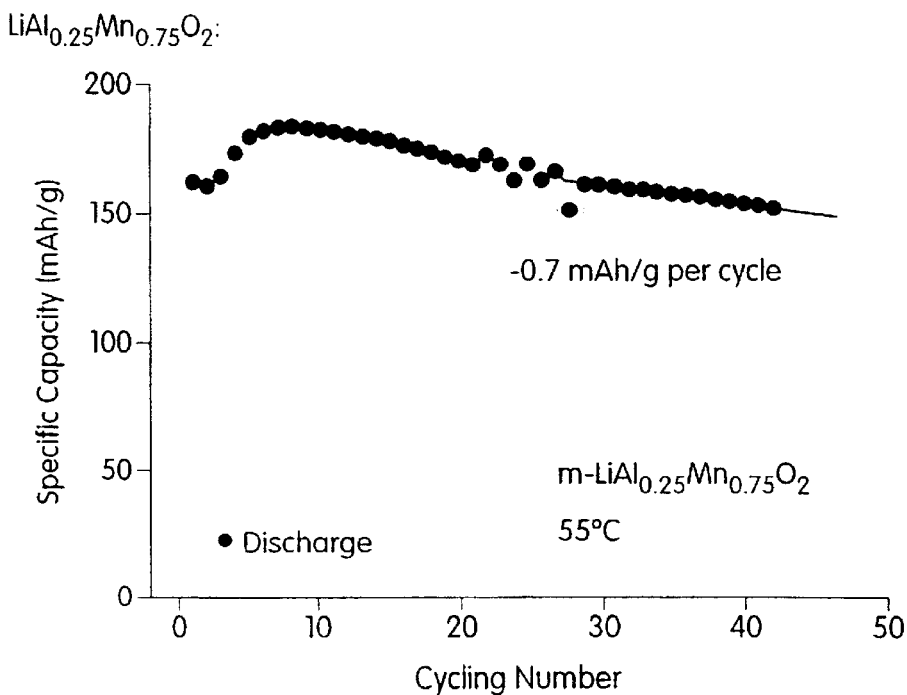
FIGS. 17(A–B) shows the specific capacity vs. cycle number for electrochemical test cells containing m-LiAl$_{0.25}$Mn$_{0.75}$O$_2$ and m-LiAl$_{0.05}$Mn$_{0.95}$O$_2$ cycled at 55° C. according to Example 1.
Figure 17B:
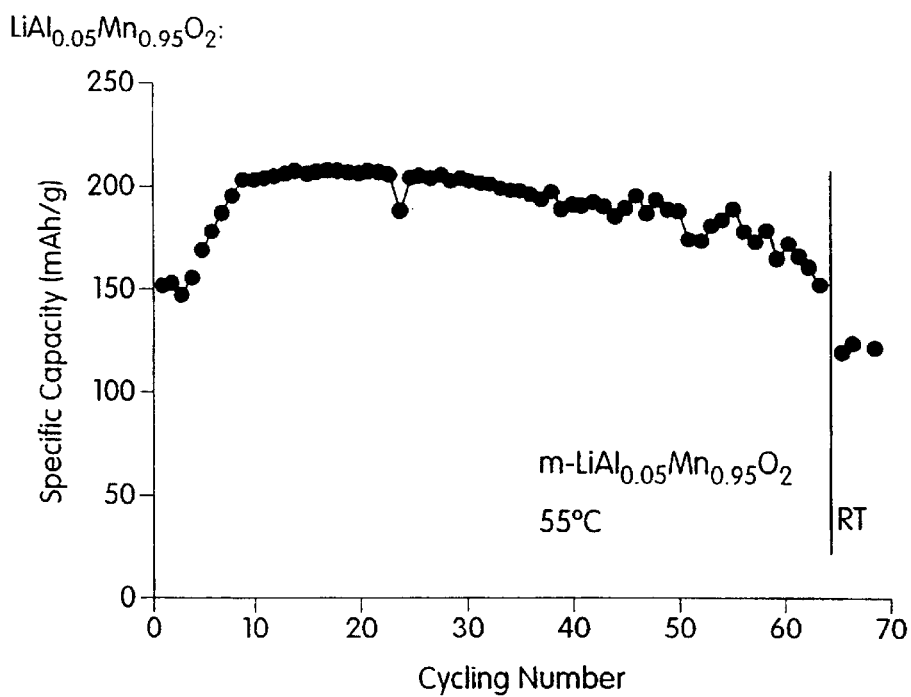
Figure 18:
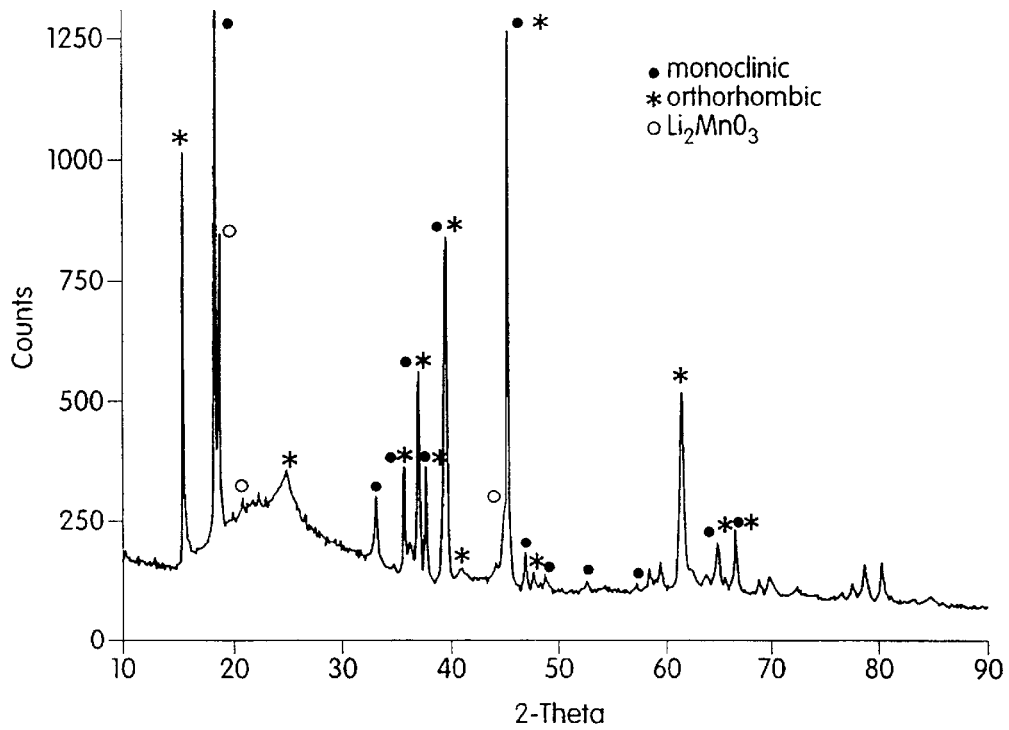
FIG. 18 shows the powder X-ray diffraction pattern of a composition m-LiAl$_{0.05}$Mn$_{0.95}$O$_2$ fired 2 h at 900° C. and $P_{O2}=10^{-6}$ atm, according to Example 2.

The compounds m-$LiAl_{0.05}Mn_{0.95}O_2$ and m-$LiAl_{0.25}Mn_{0.75}O_2$ were tested in the same cell construction as described above at elevated temperature of 55° C.–70° C. Typical prior art $LiMn_2O_4$ spinel loses capacity rapidly upon cycling at and upon storage at such temperatures. For use in applications where heat is generated, such as laptop computers or high discharge-rate applications, this is a great limitation to the application of conventional $LiMn_2O_4$ spinel. To accelerate testing of our compounds, a charging current of 1.6 mA/cm$^2$ corresponding approximately to a C/2 rate (where C is the capacity and C/2 refers to fully charging or discharging in 2 hours) and a discharge current density of 0.4 mA/cm2 corresponding approximately to a C/8 rate were used. FIG. 11 shows cycling tests for an m-$LiAl_{0.25}Mn_{0.75}O_2$ cell at 60° C. and 70° C. The first 3 cycles were conducted at 60° C., and then the temperature was raised to 70° C. After a total of 7 cycles, the energy density is 482 Wh/kg. FIG. 12 shows test results at room temperature (23° C.) and 55° C. for an m-$LiAl_{0.25}Mn_{0.75}O_2$ cell. Remarkably, the capacity is higher at 55° C. than at room temperature. This result is surprising based on the prior art. FIGS. 13–16 show the charge-discharge curves for the 1st, 6th, 17th, and 34th cycles respectively in m-$LiAl_{0.05}Mn_{0.95}O_2$ at 55° C. They, like the room temperature tests, show the rapid evolution to a voltage profile with two voltage plateaus. FIG. 17 shows extended cycling results (2.0–4.4 V) for m-$LiAl_{0.05}Mn_{0.95}O_2$ and m-$LiAl_{0.25}Mn_{0.75}O_2$ at 55° C. For m-$LiAl_{0.25}Mn_{0.75}O_2$, the capacity remains above 150 mAh/g after 42 cycles. For m-$LiAl_{0.05}Mn_{0.95}O_2$, the capacity rises over the first 10 cycles to a plateau value in excess of 200 mAh/g. It is understood from the STEM results that the solid solution phase of these two compositions have a similar compositions, and the higher capacity of m-$LiAl_{0.05}Mn_{0.95}O_2$, is due to a lesser amount of electrochemically inactive aluminum oxide phase. After 65 cycles at 55° C., the m-$LiAl_{0.05}Mn_{0.95}O_2$ was cooled to room temperature, and showed approximately 120 mAh/g capacity.

The results show that the compounds of this invention have electrochemical properties superior to those in conventional lithium manganese oxide spinels. The properties are also superior to those in monoclinic $LiMnO_2$ prepared by ion exchange of Li with $NaMnO_2$ (G. Vitins and K. West, J. Electrochem. Soc., Vol. 144, No. 8, pp. 2587–2592, 1997), which loses capacity rapidly when cycled over both voltage plateaus. The stability of the present intercalation compounds when cycled over both voltage plateaus increases the practical capacity and energy density of the compound compared to other Li—Mn—O compounds that can only be repeatedly cycled over one voltage plateau without incurring significant capacity loss. The fact that Al additions to a lithium manganese oxide will result in such improvements is surprising, based on the prior art. In fact, F. Le Cras et al. (Solid State Ionics, Vol. 89, pp. 203–213, 1996) report that a spinel of composition $LiAlMnO_4$ exhibits rapid capacity loss upon cycling over a similar voltage range, thereby teaching away from the present invention.

Orthorhombic $Li_xAl_yMn_{1-y}O_2$

A further embodiment of the invention involves the synthesis of an orthorhombic $Li_xAl_yMn_{1-y}O_2$ having elevated temperature stability in a lithium battery utilizing organic liquid electrolyte as well as very high capacity and energy density. Example 2 shows that such a compound can be synthesized.

EXAMPLE 2

Orthorhombic $Li_xAl_yMn_{1-y}O_2$ Compound

Figure 19:
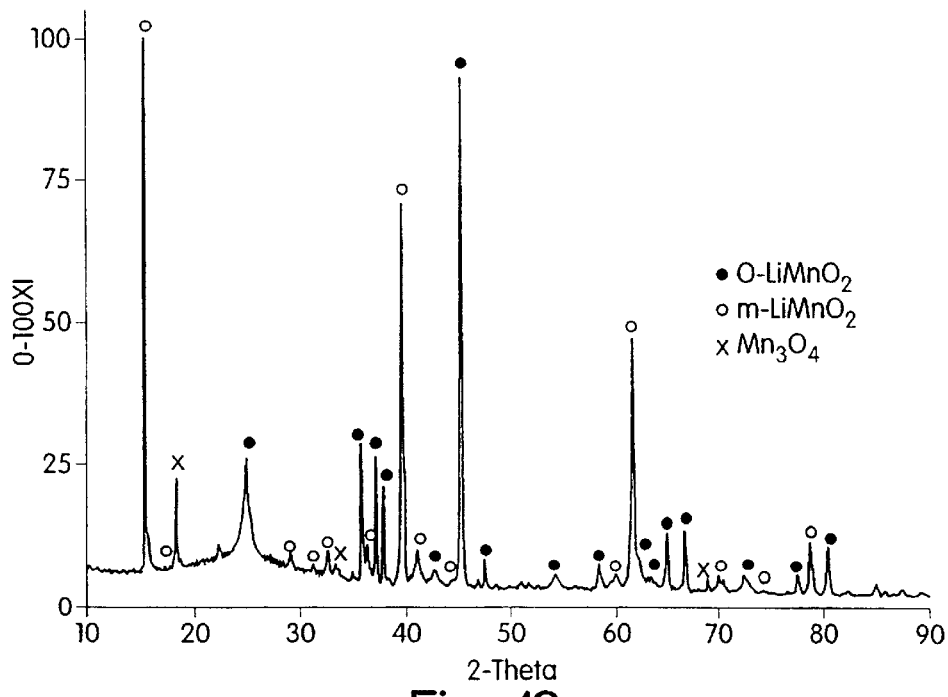
FIG. 19 shows the powder X-ray diffraction pattern of a composition m-LiAl$_{0.05}$Mn$_{0.95}$O$_2$ fired 2 h at 900° C. and $P_{O2}=10^{-10}$ atm, according to Example 2.

A starting composition $Li_{1.05}Al_{0.05}Mn_{0.95}O_2$ was prepared by the methods of Example 1, and fired at 900° C. for 2 hours in a $CO/CO_2$ mixture giving an oxygen partial pressure of $10^{-6}$ atm. FIG. 19 shows that the composition contains three phases: monoclinic $Li_xAl_yMn_{1-y}O_2$, orthorhombic $Li_xAl_yMn_{1-y}O_2$, and $Li_2MnO_3$. This result shows that an orthorhombic $Li_xAl_yMn_{1-y}O_2$ compound is achievable.

In a second experiment, a precursor of overall composition $Li_{1.05}Al_{0.05}Mn_{0.95}O_2$ was prepared by the methods of Example 1. This composition previously gave $m-Li_xAl_yMn_{1-y}O_2$ when fired at 945° C. in reducing atmosphere, as we described in previous examples. We fired the precursor at 900° C. in a $CO/CO_2$ gas atmosphere giving an oxygen partial pressure of $PO_2=10^{-10}$ atmospheres, for 2 hours. An X-ray diffractogram of the resulting material appears in FIG. 19. This figure shows that the majority phase is in the orthorhombic phase, with only a small amount of the monoclinic phase and very minor amount of $Mn_3O_4$ being detectable.

Evidence that the orthorhombic phase is Al-doped includes the following. The sample contains a total of about 5% of Al on a cation basis. From the intensity of the X-ray diffraction peaks, it is determined that there is at most 15% by mole of the monoclinic phase and 5% by mole of the $Mn_3O_4$. Our previous experiments have shown that the solid solubility of Al in the monoclinic phase at 945° C. is approximately 5%. At the present firing temperature of 900° C. it is even lower. Taking the 5% solubility as an upper limit of the amount of Al in the monoclinic phase, which in turn constitutes 15% of the whole, 4.25% of the Al is most likely apportioned between the orthorhombic phase and the $Mn_3O_4$. Since the total amount of $Mn_3O_4$ is at most about 5%, the orthorhombic phase may be Al-doped, and that $o-Li_xAl_yMn_{1-y}O_2$ has most likely been synthesized.

A preferred embodiment of this compound has an aluminum content of y less than about 0.25.

Figure 20:
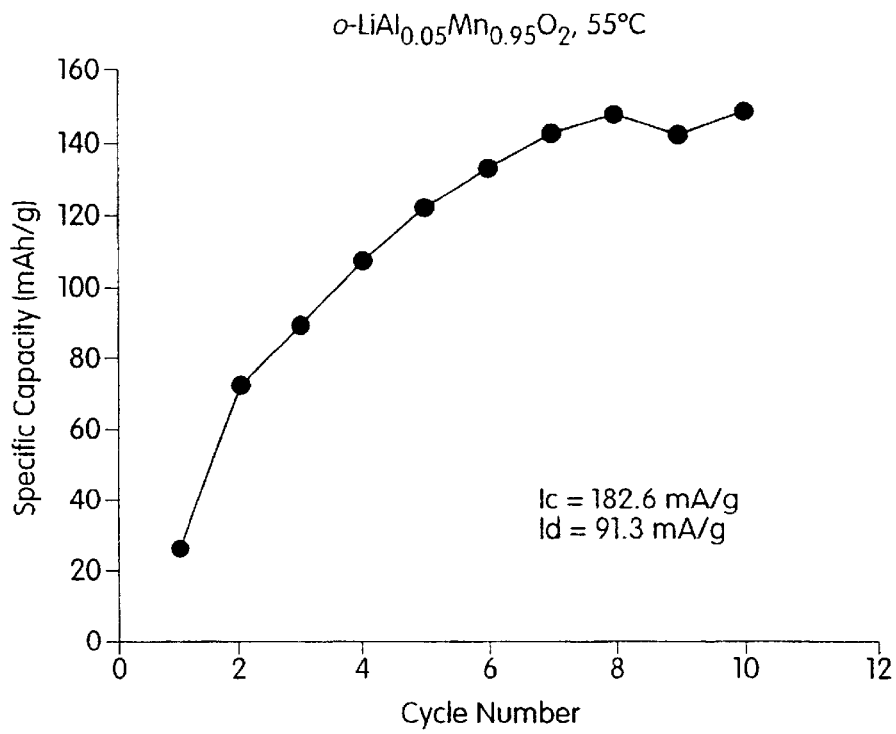
FIG. 20 shows the specific capacity vs. cycle number for an electrochemical test cell containing m-LiAl$_{0.05}$Mn$_{0.95}$O$_2$ cycled at 55° C. according to Example 2.
Figure 21:
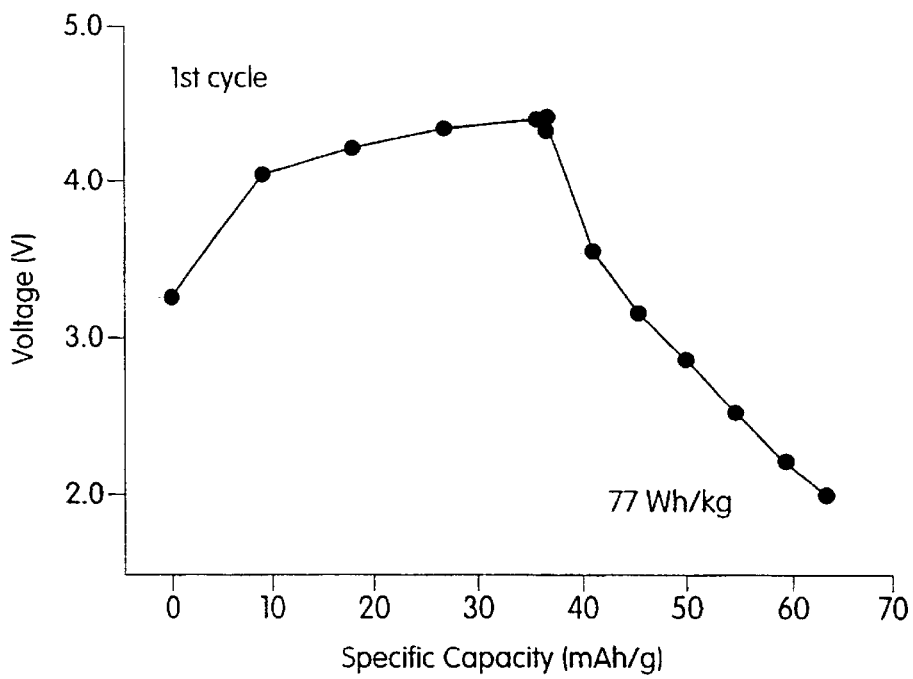
FIG. 21 shows the first charge-discharge curve at 55° C. for an electrochemical test cell containing m-LiAl$_{0.05}$Mn$_{0.95}$O$_2$ according to Example 2.
Figure 22:
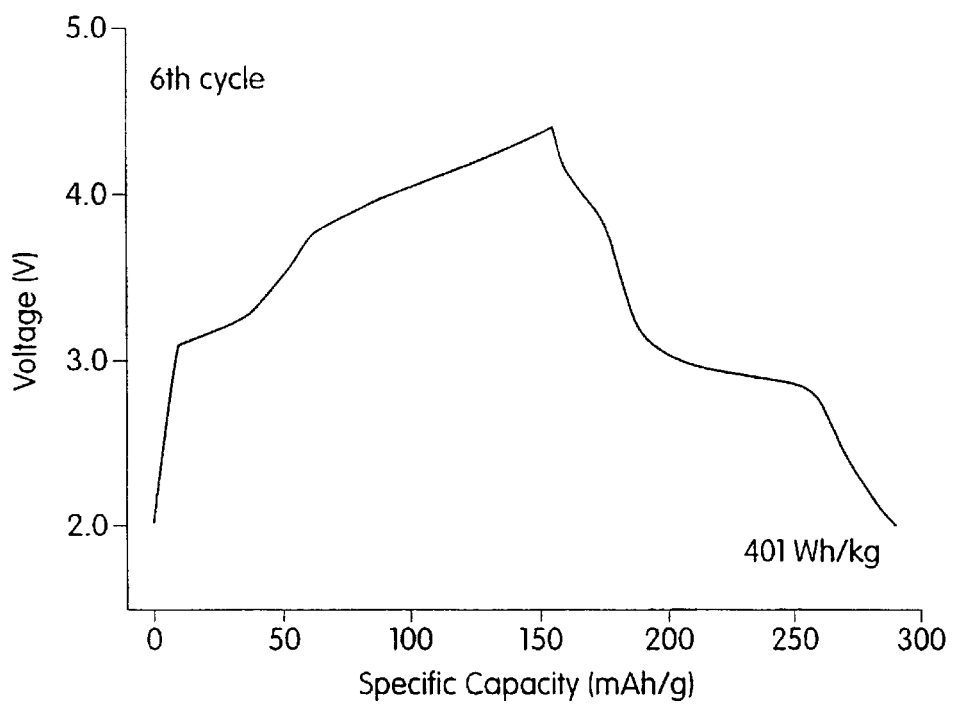
FIG. 22 shows the charge-discharge curve at 55° C., cycle 6, for an electrochemical test cell containing m-LiAl$_{0.05}$Mn$_{0.95}$O$_2$ according to Example 2.
Figure 23:
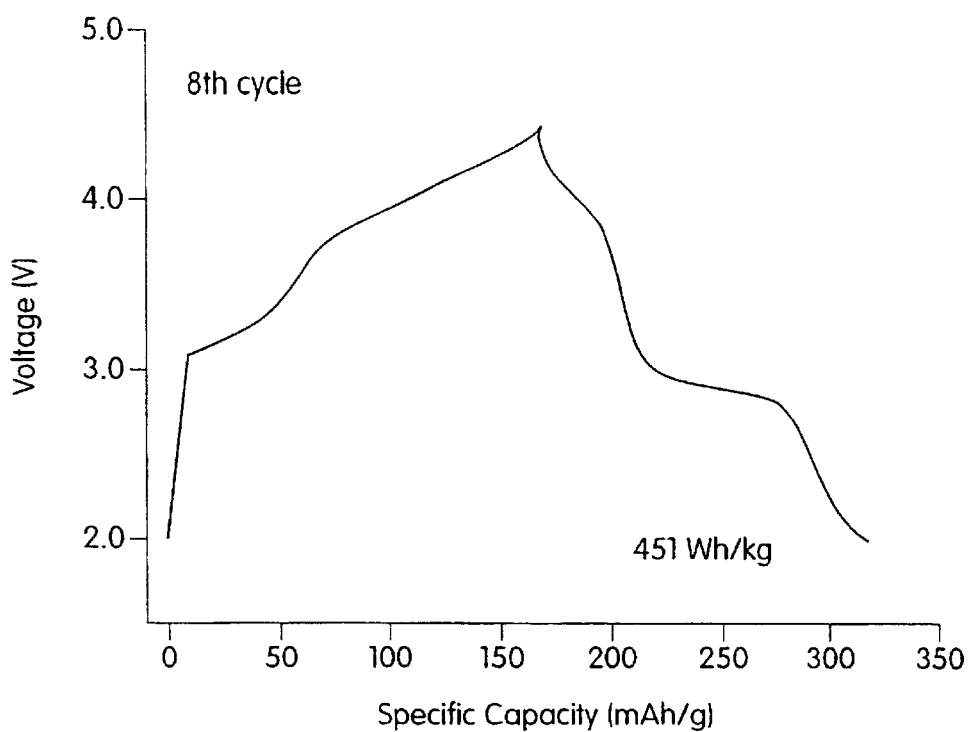
FIG. 23 shows the charge-discharge curve at 55° C., cycle 8, for an electrochemical test cell containing m-LiAl$_{0.05}$Mn$_{0.95}$O$_2$ according to Example 2.

This $o-Li_xAl_yMn_{1-y}O_2$ material was fabricated into an electrochemical cell as described in Example 1. FIG. 20 shows the discharge capacity for this cell as a function of cycle number at a test temperature of 55° C., in a cycling test where the charging current was 183 mA/g, and the discharging current was 91 mA/g. This is a high current density, corresponding approximately to a C/0.8 charging rate and C/1.6 discharging rate at the $10^{th}$ cycle. The discharge capacity increases rapidly over the first few cycles, reaching a value of approximately 150 mAh/g at the $10^{th}$ cycle. The corresponding energy density is about 450 Wh/kg. FIGS. 21–23 show the charge-discharge curves for the $1^{st}$, $6^{th}$, and $8^{th}$ cycles respectively. Like the undoped $o-LiMnO_2$, this material undergoes a conditioning stage during which two voltage plateaus develop upon cycling, resulting in a capacity and energy density after repeated cycling at high charge-discharge rates that is markedly superior to that of conventional $LiMn_2O_4$ spinels. Also, like the $m-Li_xAl_yMn_{1-y}O_2$ compound, this material exhibits these excellent properties at an elevated temperature. Thus the utility of $o-Li_xAl_yMn_{1-y}O_2$ as an intercalation electrode for rechargeable lithium batteries can be demonstrated.

Multicomponent Metal Oxides

Another aspect of the invention involves formation of a shielding layer on the exterior of particulate metal oxide material that can be ion intercalation particles such as lithium intercalation particles $Li_xM_yN_zO_2$ as described herein. The particles are of multicomponent metal oxide, and each include an oxide core of at least first and second metals in a first ratio, and a surface coating of metal oxide or hydroxide that does not include the first and second metals in the first ratio. The surface coating can be formed by segregation of at least one of the first and second metals from the core. The particles can be used in battery arrangements as described herein. The surface-layer shielded particles can be made, according to one embodiment, by allowing a first component of a multicomponent oxide based intercalation compound to segregate from a plurality of particles of the compound disproportionately to the surfaces of the plurality of particles to form protective layers of the first component on the particles. The particles can be exposed to chemically degrading conditions, and the layers can be allowed to shield the particles from the chemically degrading conditions such that the particles exhibit robustness, under the conditions, greater than identical particles absent the layers.

In a preferred embodiment, the intercalation compound is an Al/Mn compound in which the aluminum component is allowed to segregate from the manganese rich oxide, resulting in a microstructure in which amorphous aluminum oxides or hydroxides spontaneously form as a layer on the crystalline intercalation compound. This surface layer protects and stabilizes the underlying intercalation compound against dissolution and chemical attack in the environment of a lithium ion battery, thereby contributing to increased charge capacity, less capacity fade upon cycling, and increased stability against capacity loss at elevated temperatures.

This aspect of the invention encompasses any component of a multicomponent oxide intercalation compound which tends to spontaneously separate, which will tend to do so as a surface layer, and that this surface layer can serve the protective role that aluminum oxide/hydroxide does in this example. Other such components include boron oxide, phosphorous oxide, silicon oxide, and oxides of the 3d metals.

EXAMPLE 3

A powder of composition $LiAl_{0.25}Mn_{0.75}O_2$, prepared according to Example 1 was stored at room temperature in air for 4 months, then examined by transmission electron microscopy (TEM) and scanning transmission electron microscopy (STEM). This powder exhibited, by powder x-ray diffraction, the monoclinic derivative of the α-$NaFeO_2$ structure type as the majority crystalline phase, and exhibited a microstructure in which crystalline oxide particles rich in Mn were surrounded by amorphous or nanocrystalline layers of a phase that is rich in Al. This layer is an aluminum oxide, possibly hydrated to some degree. It tends to spontaneously form from the overall composition of the material $Li_xAl_yMn_{1-y}O_2$.

Figure 24:
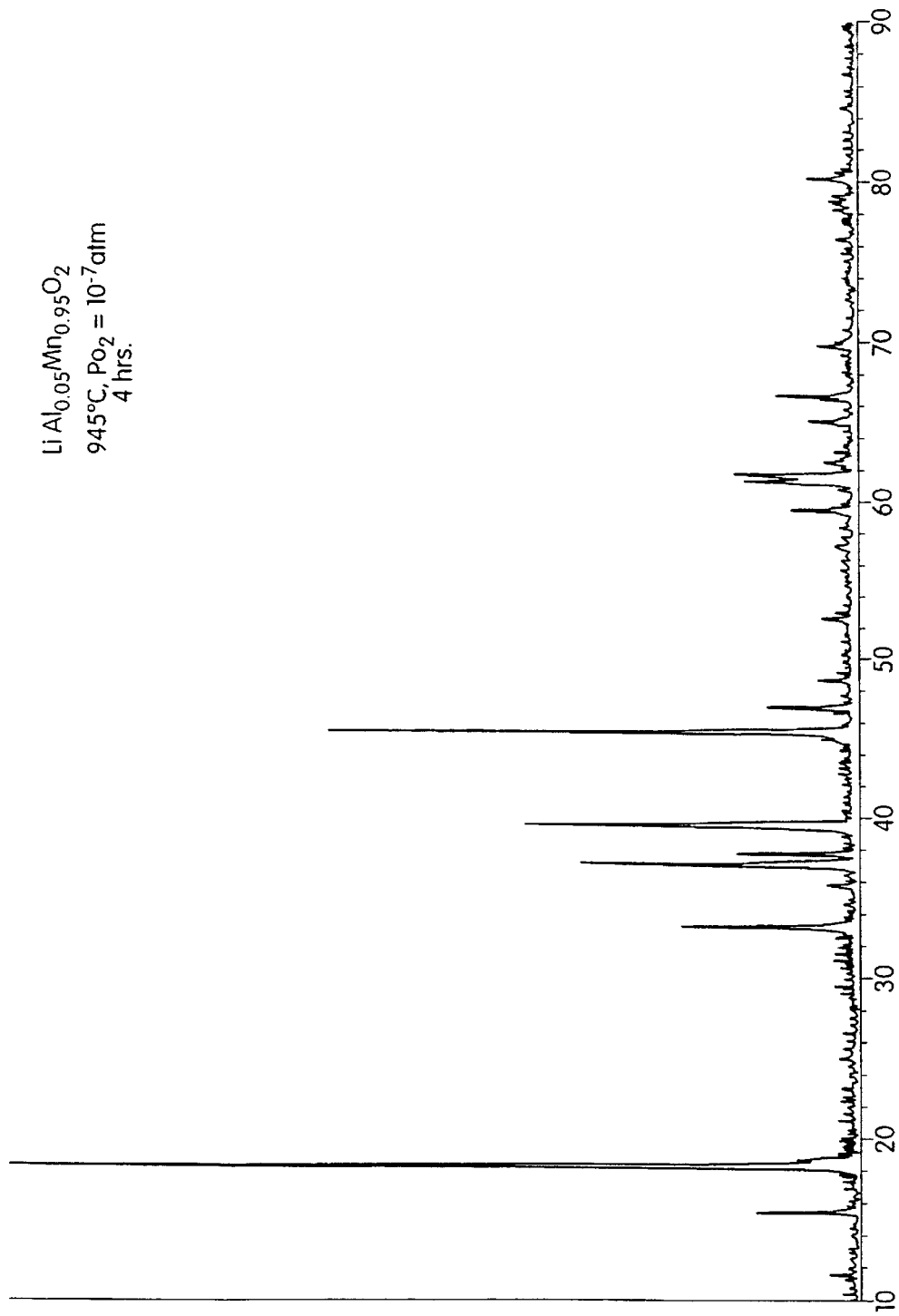
FIG. 24 shows the powder X-ray diffraction pattern of m-LiAl$_{0.05}$Mn$_{0.95}$O$_2$ prepared according to Example 1.

The stabilizing effect of aluminum addition in $Li_xAl_yMn_{1-y}O_2$ was demonstrated to apply to a range of compositions by carrying out studies with $LiAl_{0.05}Mn_{0.95}O_2$, is stabilized in the α-$NaFeO_2$ structure type. The composition $LiAl_{0.05}Mn_{0.95}O_2$ was prepared using a procedure as described in Example 1. The sample was fired in reducing atmosphere at 945° C. X-ray diffraction, FIG. 24, showed that the resulting powder has the monoclinic derivative of the α-$NaFeO_2$ structure type, as previously found in the composition $LiAl_{0.25}Mn_{0.75}O_2$. The as-prepared $LiAl_{0.05}Mn_{0.95}O_2$ powder was examined in a Vacuum Generators HB 603 STEM, and bright-field imaging and energy dispersive X-ray mapping for Al and Mn were conducted. FIG. 4 shows a bright-field image of the powder particles, along with the X-ray maps showing Al and Mn distribution. The presence of Mn appears to be accompanied by the presence of Al with a constant relative Al/Mn x-ray intensity ratio throughout the powder particles. The composition is most likely uniform, and that there is not initially a distinguishable surface layer or separation of the Al and Mn into separate regions.

FIGS. 5 and 6 show STEM results for $LiAl_{0.25}Mn_{0.75}O_2$ powder after storage at room temperature in a sealed container for 6 months. Separation of the powder into distinct Al-rich and Mn-rich regions is observed. FIG. 7 shows X-ray diffraction results from this powder before and after storage. A broad background, typically indicating the presence of an amorphous phase, has appeared after storage. The peak intensities and peak positions for the monoclinic $\alpha$-$NaFeO_2$ phase have also changed. These results may show that the $Li_xAl_yMn_{1-y}O_2$ solid solution prepared according to the present invention has a strong tendency towards phase separation into Al-rich and Mn-rich oxides, even at room temperature. Such separation can occur during electrochemical cycling, leading to a structure in which the Alrich oxide protects the Mn-rich oxide from exposure to surrounding media including the electrolyte in a rechargeable lithium battery.

Compositions Including Cathodes Using Mixtures of Intercalation Compounds

The advantages conferred by any one of the above compounds can also be realized in a mixture of any two or more. That is, it is not necessary to realize a single-phase compound in order to realize the advantages of high energy density, long cycle life, and elevated temperature stability discussed earlier. Such mixtures can be achieved by physical mixing of separately prepared powders, or by a single material prepared so as to achieve more than one phase, as exemplified by Example 2. Thus, in one aspect of the present invention, the mixture is a composite intercalation material comprising at least two compounds.

In one embodiment, a composite defined by the mixture comprises at least two different compounds where each of the at least two different compounds is present in an amount of at least about 1%, preferably at least about 5%, more preferably at least about 10%. Each of the at least two compounds can be present in greater amounts, for example at least about 25% or 35%, in some embodiments.

In one embodiment, the composite intercalation material comprising at least two compounds comprises at least one compound having an orthorhombic structure $Li_xAl_yMn_{1-y}O_2$, where y is nonzero. In another embodiment, the composite intercalation material comprises a mixture of orthorhombic and monoclinic $Li_xAl_yMn_{1-y}O_2$. In another embodiment, the composite comprises monoclinic $Li_xAl_yMn_{1-y}O_2$ and orthorhombic $Li_xAl_yMn_{1-y}O_2$ or $Li_xAl_yMn_{1-y}O_2$.

Such a mixture can confer additional improvements in properties not realizable with a single compound or phase. A particular embodiment results in a voltage-vs.-capacity curve, hereafter referred to as the "voltage profile," which is advantageous. The above results have shown that monoclinic $Li_xAl_yMn_{1-y}O_2$ and orthorhombic $Li_xMnO_2$ or $Li_xAl_yMn_{1-y}O_2$ have different rates of lithium intercalation and de-intercalation, the latter two compounds being typically slower. However, both compounds exhibit a two-step voltage profile with plateaus at about 4 V and about 3 V. When both compounds are present in one electrode, they will intercalate and de-intercalate lithium at different rates. This has the effect of "voltage averaging" such that the voltage profile of the resulting compound exhibits less sharply defined plateaus. A more gradually varying voltage profile is advantageous in many battery applications.

A composite electrode giving voltage profile smoothing as described above can be achieved with a mixture of different compounds with disparate lithium chemical diffusion rates, or with a mixture of compounds of similar or identical lithium chemical diffusion rate but varying particle size. To realize such voltage smoothing, the rate-limiting transport step in the electrode is most likely diffusion in one or more of the intercalation compounds. Such a composite cathode can be realized not only with the compounds of Examples 1–3, but also with any combination of individual intercalation compounds satisfying the requirement of disparate lithium chemical diffusion rates or widely varying particle size, in an electrode construction whereby lithium diffusion in the compounds is rate-limiting.

One aspect of the present invention provides a composite intercalation compound containing at least two individual intercalation compounds, each compound having a different lithium chemical diffusion rate and a voltage vs. capacity profile that varies more continuously than the voltage vs. capacity profile of any noncomposite intercalation compound.

Another aspect of the present invention provides a composite intercalation compound containing at least two individual intercalation compounds, each compound having a different article size and having a voltage vs. capacity profile that varies more continuously than the voltage vs. capacity profile of any noncomposite intercalation compound.

In one embodiment, an electrode for a lithium battery contains a compound having a different particle size and a voltage vs. capacity profile as described above where the compound has a particle size sufficient to cause the slowest lithium transport step in the electrode to be the diffusion of lithium in the compound.

In one aspect of the present invention, a composite intercalation material comprises at least two compounds having at least one compound, which upon electrochemical cycling, has a transformation in the voltage vs. capacity curve from a single plateau at about 4 V to two plateaus at about 4 V and 3 V respectively.

In one aspect of the present invention, a composite intercalation material comprises at least two compounds having at least one compound with a discharge capacity of at least about 100 mAh/g over the voltage range 2.0–4.4 V, and an energy density of at least about 400 Wh/kg after 50 cycles.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A composition including:
    particulate metal oxide material including a plurality of particles of multicomponent metal oxide, each including an oxide core of at least first and second metals in a first ratio, and each including a surface coating of metal oxide or hydroxide that does not include the first and second metals in the first ratio formed by segregation of at least one of the first and second metals from the core.

2. An article including a plurality of particles as recited in claim 1, wherein the particles are ion intercalation particles at least some of which are in contact with an electrically-conductive material and on ionically-conductive material.

3. An article as in claim 2, constructed and arranged as an electrode useable in an ion-conducting battery.

4. A composition as in claim 1, wherein each particle includes a surface layer of a thickness at least about 2% the diameter of the particle.

5. A composition as in claim 1, wherein each particle includes a surface layer of a thickness at least 5% the diameter of the particle.

6. A composition as in claim 1, wherein each particle includes a surface layer of a thickness at least 5 nm.

7. A composition as in claim 1, wherein the surface coating is amorphous or glassy.

8. A composition as in claim 1, wherein the surface coating and each particle of the plurality of particles have a same crystal structure.

9. A compositions as in claim 1, wherein the surface coating is an epitaxial crystalline layer extending a crystal lattice of each particle of the plurality of particles.

10. A composition including:

particulate metal oxide material including a plurality of particles of a multicomponent metal oxide, each including an oxide core of at least first and second metals in a first ratio, and each including a surface coating of metal oxide or hydroxide that does not include the first and second metals in the first ratio formed by application of an auxiliary metal oxide or hydroxide to the particles, and the cores comprise $Li_xM_yN_zO_2$, wherein M is a metal atom or a main group element, N is a metal atom or a main group element, x is a number from about 0 to about 1, y is a number from about 0 to about 1, z is a number from about 0 to about 1, y and z are such that a formal change on a $M_yN_z$ portion of the compound is (4−x), and having a charging voltage of at least about 2.5 V.

11. A non-aqueous electrolyte lithium secondary battery including a positive electrode, negative electrode capable of absorbing and desorbing lithium in a reversible manner and a lithium ion conducting non-aqueous electrolyte, wherein the positive electrode includes a composition according to claim 1.

* * * * *

UNITED STATES PATENT AND TRADEMARK OFFICE
CERTIFICATE OF CORRECTION

PATENT NO. : 6,787,232 B1
DATED : September 7, 2004
INVENTOR(S) : Chiang et al.

It is certified that error appears in the above-identified patent and that said Letters Patent is hereby corrected as shown below:

<u>Title page,</u>
Item [75], correct misspelling of inventor to read:
-- Biying Huang, Cambridge, MA (US) --

Signed and Sealed this

Twenty-third Day of November, 2004

JON W. DUDAS
*Director of the United States Patent and Trademark Office*